Figure 5:
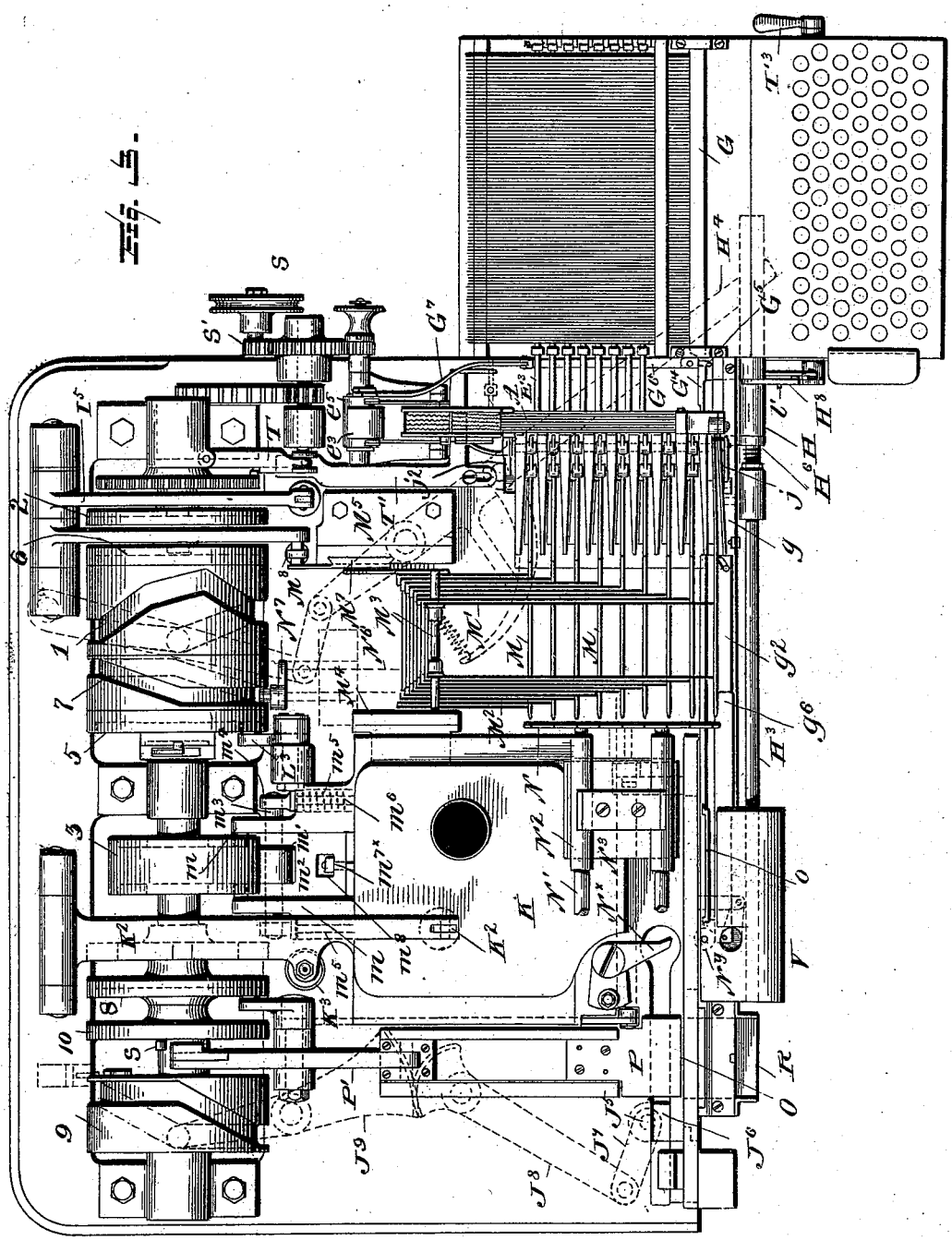
Figure 5:
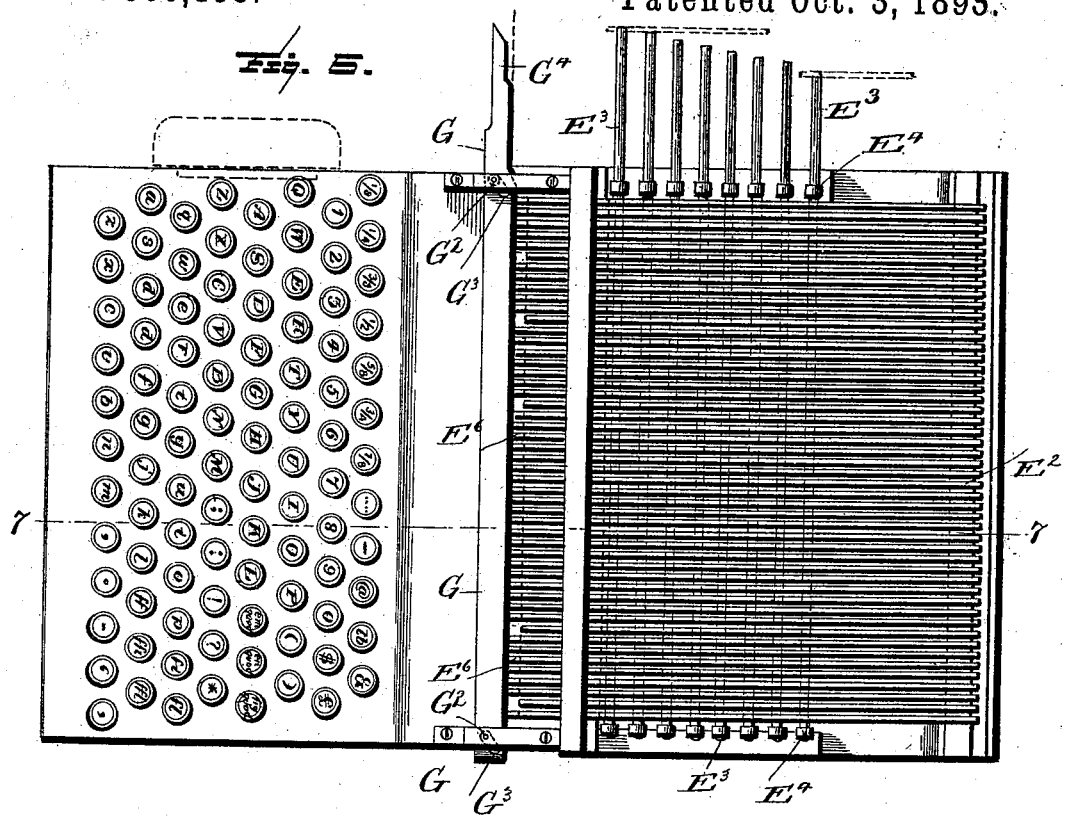

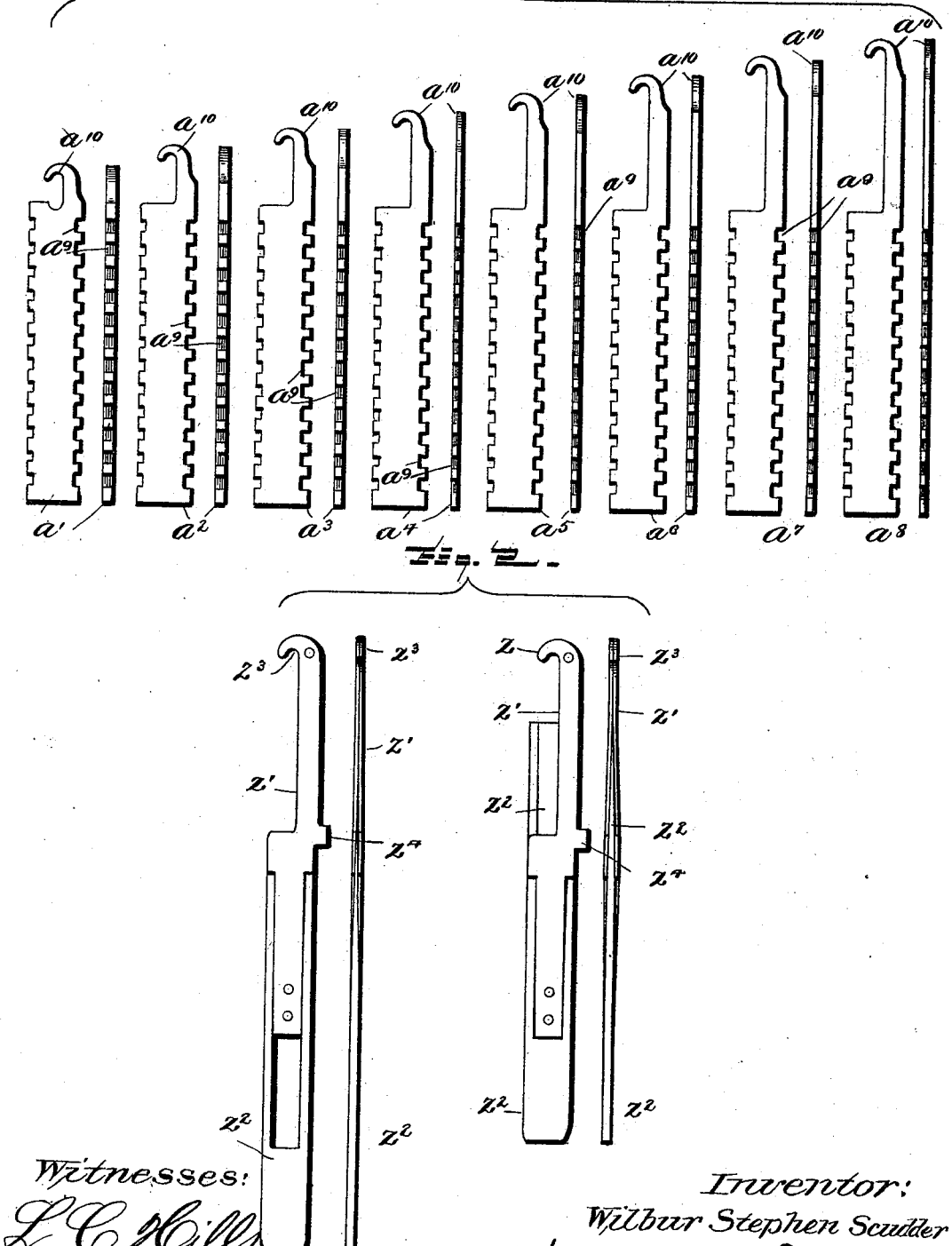

(No Model.) 17 Sheets—Sheet 2.

W. S. SCUDDER.
LINE CASTING MACHINE.

No. 506,198. Patented Oct. 3, 1893.

Witnesses:
L. C. Hills
M. W. Twitchell

Inventor:
Wilbur Stephen Scudder,
by Marcellus Bailey
Attorney (No Model.)
17 Sheets—Sheet 3.
W. S. SCUDDER.
LINE CASTING MACHINE.
No. 506,198.
Patented Oct. 3, 1893.
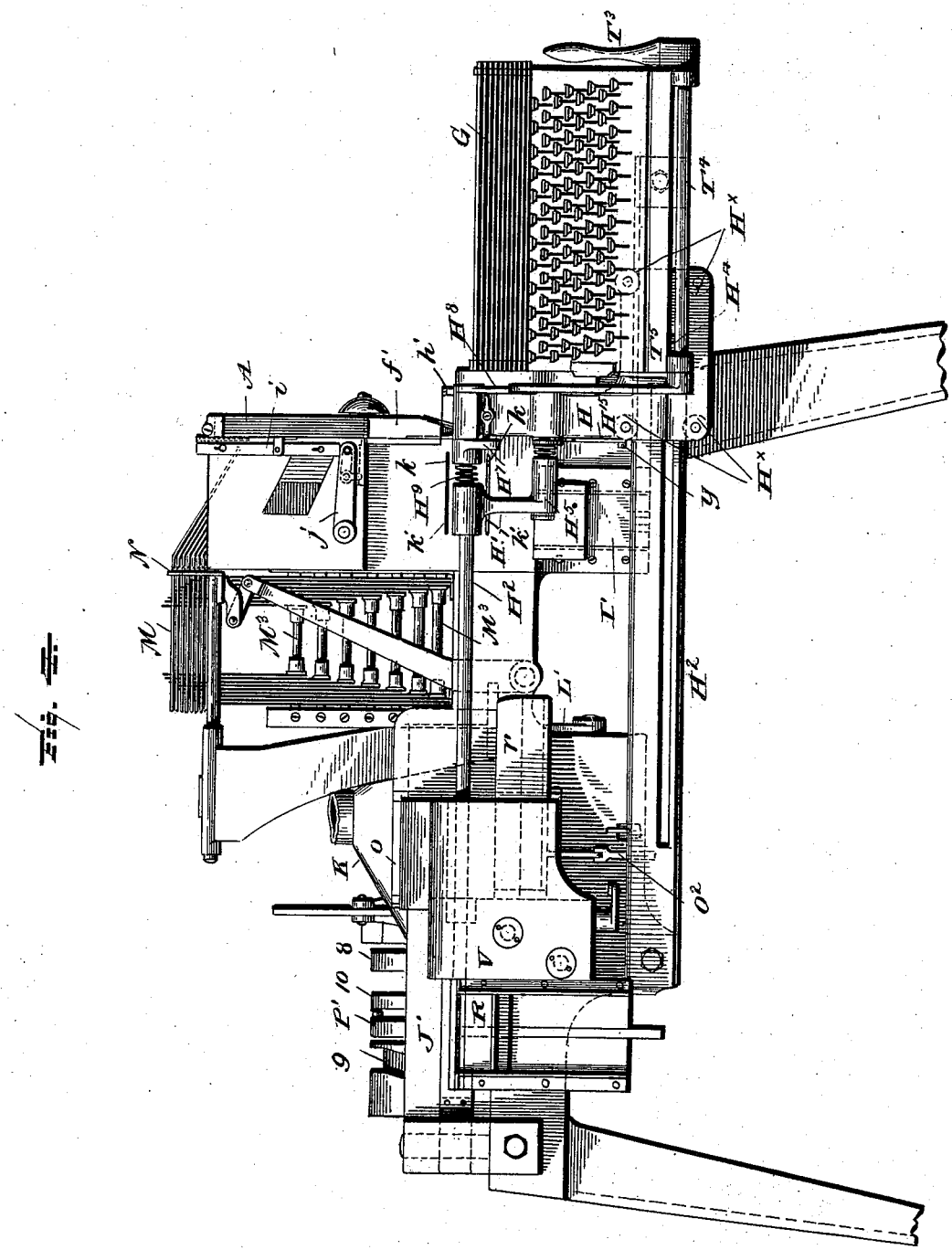
Witnesses:
L. C. Hills
M. H. Twitchell
Inventor:
Wilbur Stephen Scudder,
by Marcellus Bailey
Attorney

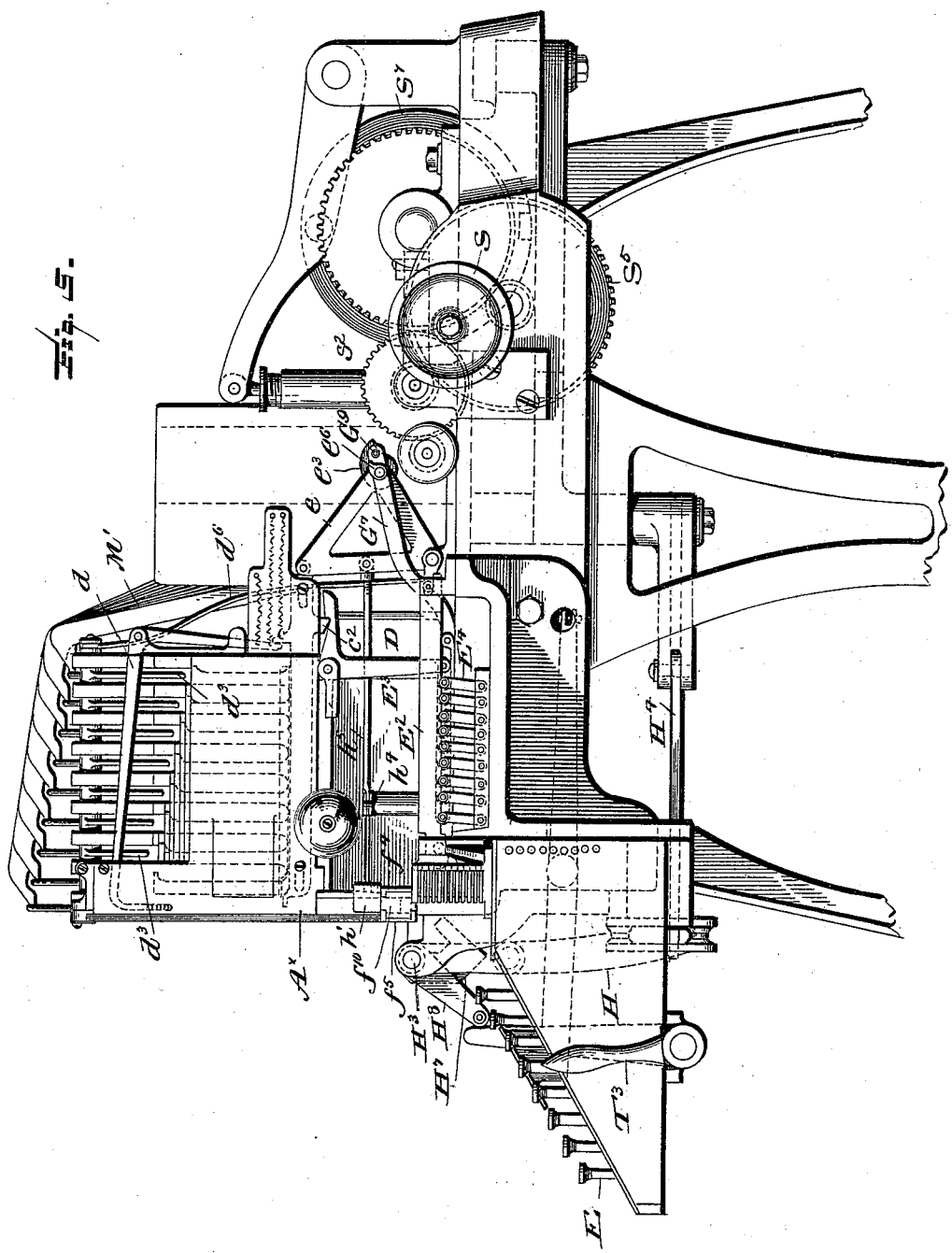

(No Model.)  17 Sheets—Sheet 5.

W. S. SCUDDER.
LINE CASTING MACHINE.

No. 506,198.  Patented Oct. 3, 1893.

Witnesses
L. C. Hills
M. W. Twitchell

Inventor:
Wilbur Stephen Scudder,
by Marcellus Bailey
Attorney

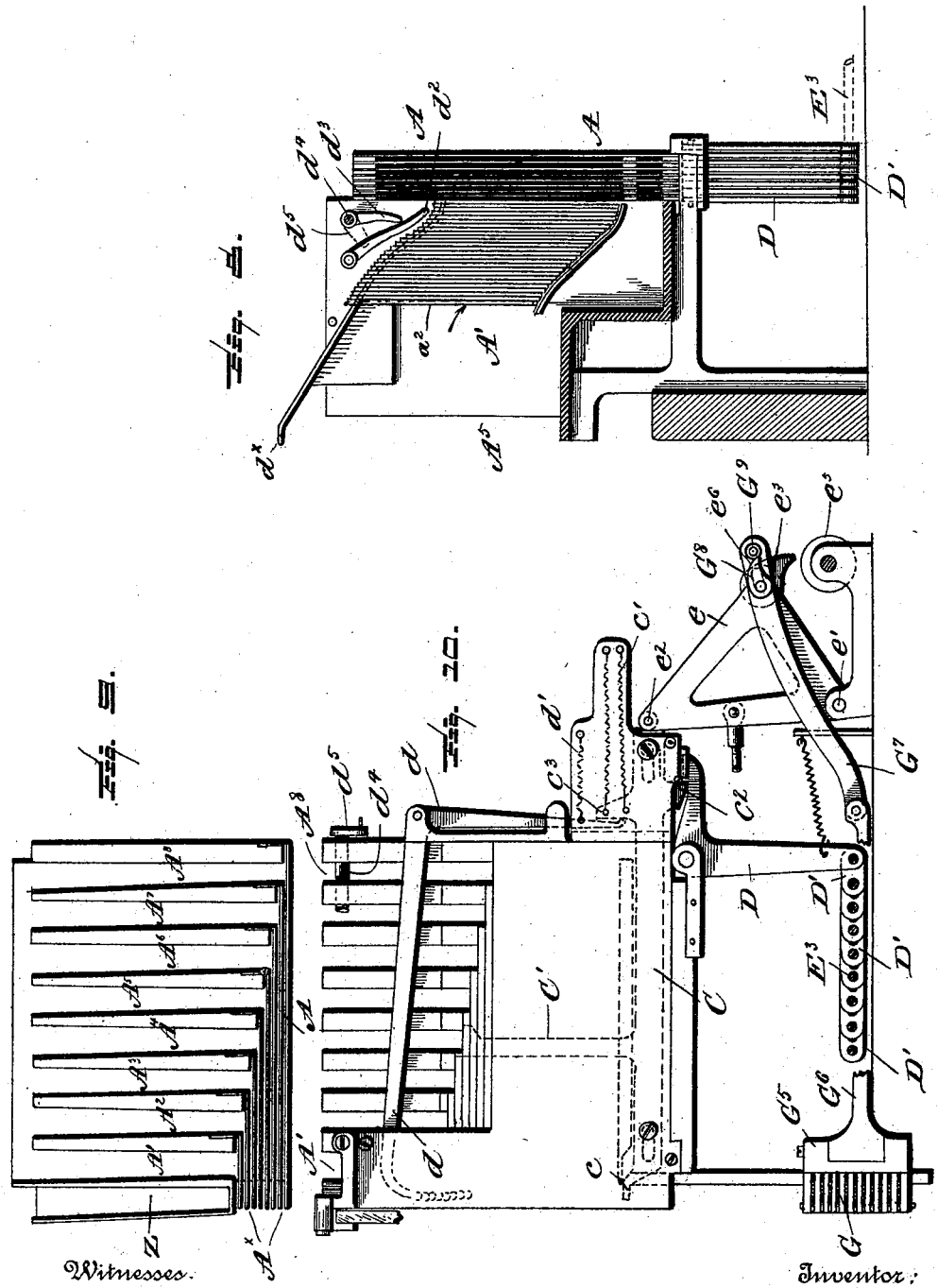

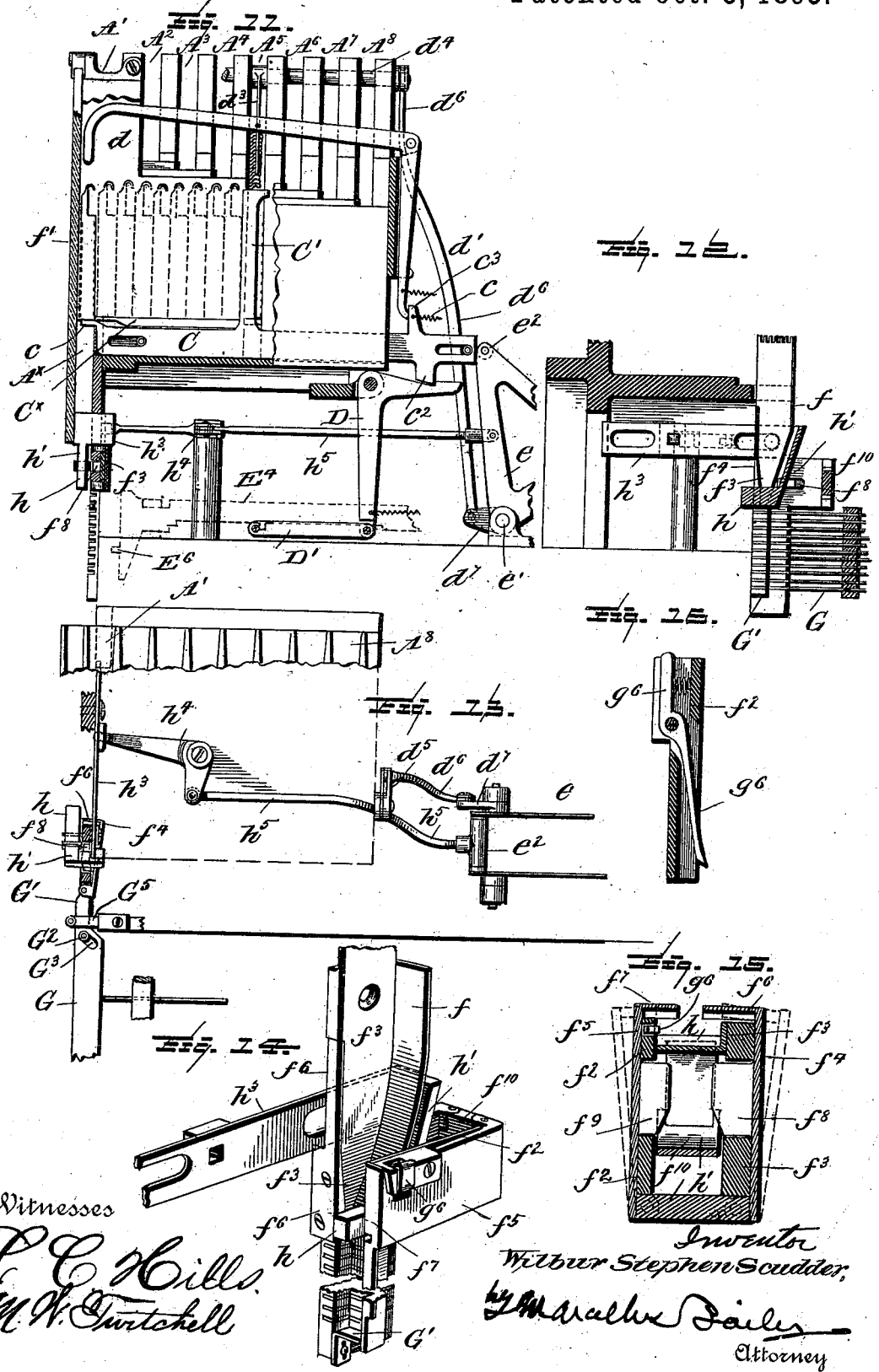

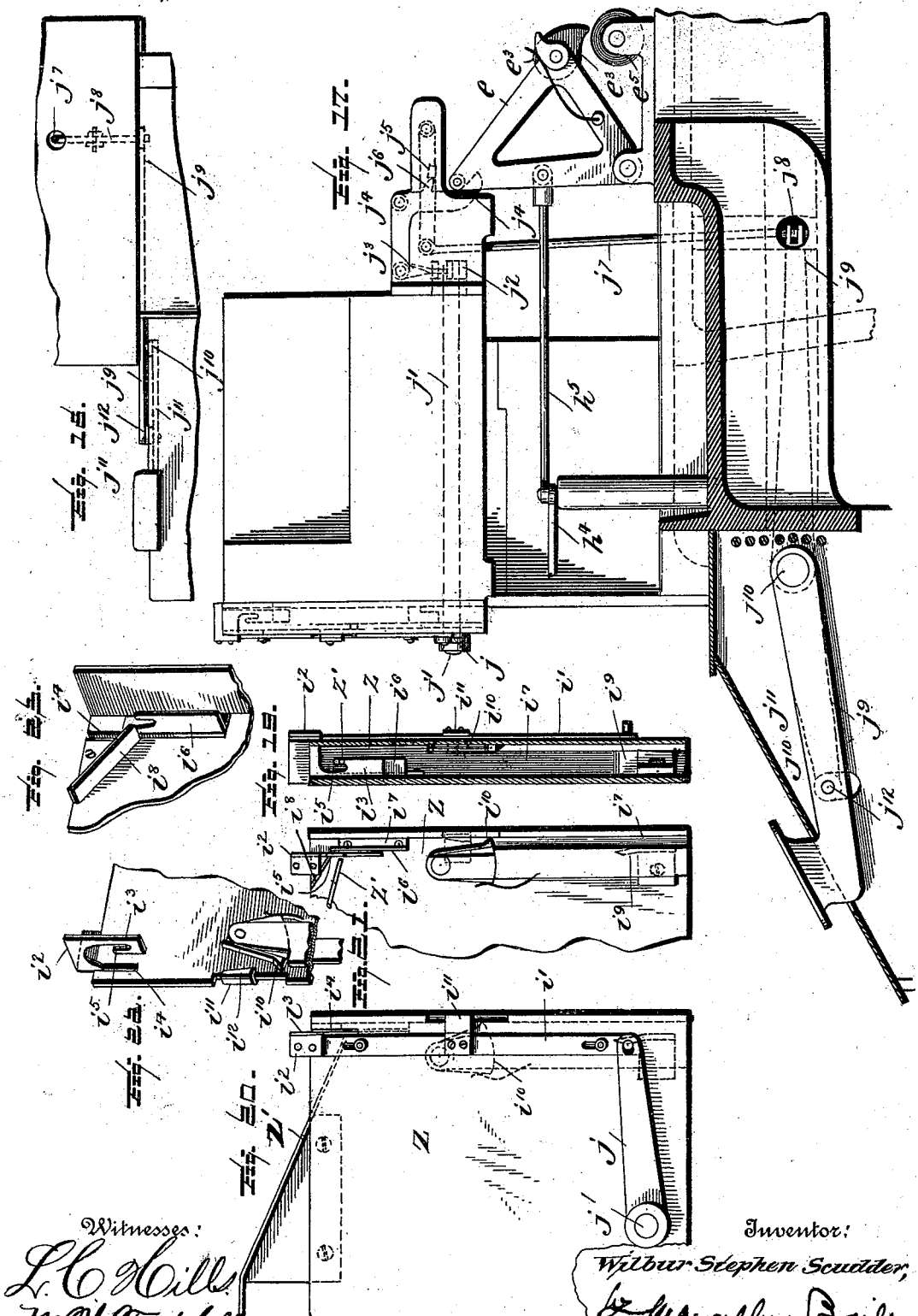

(No Model.) 17 Sheets—Sheet 9.
W. S. SCUDDER.
LINE CASTING MACHINE.
No. 506,198. Patented Oct. 3, 1893.
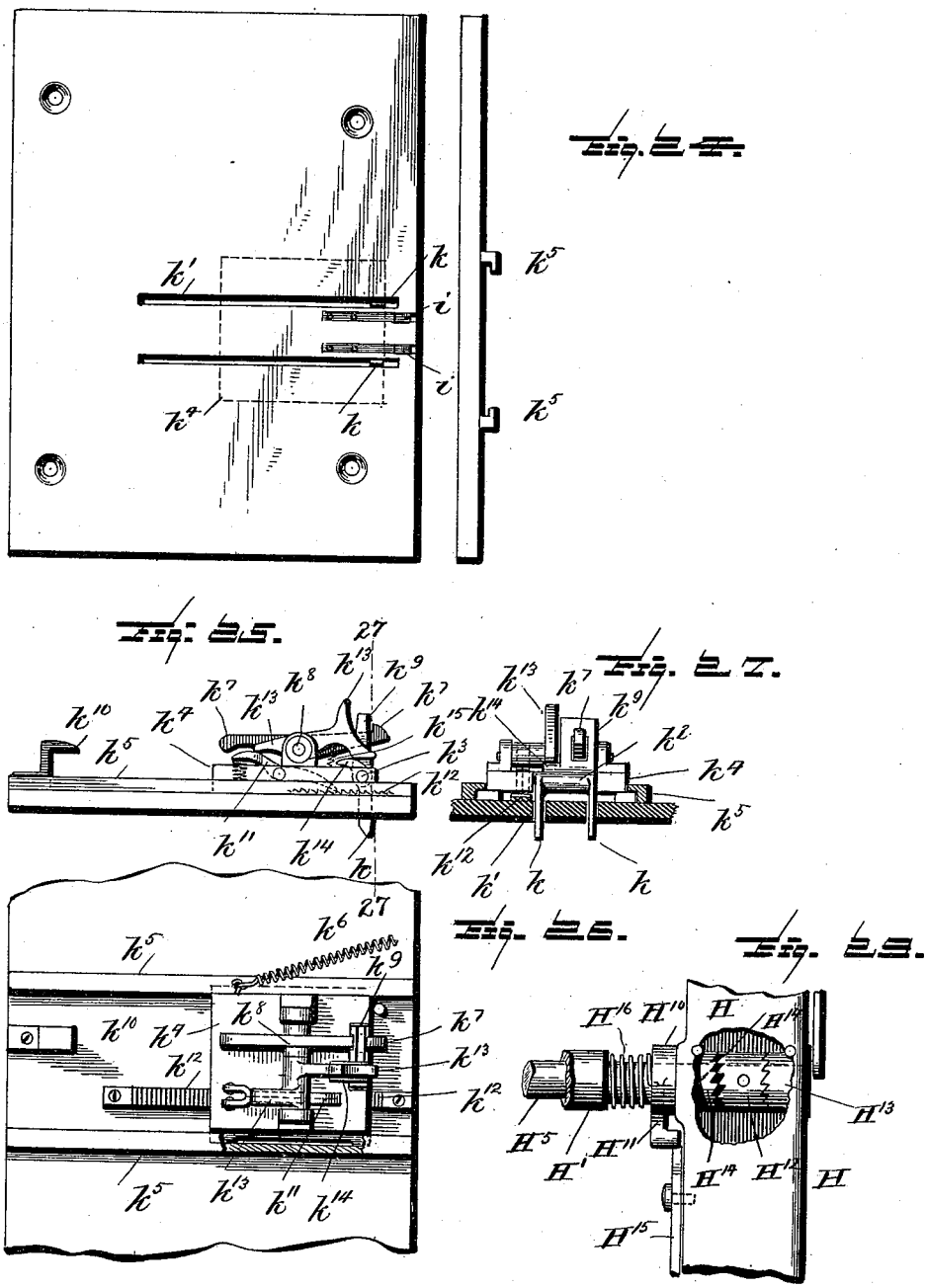
Witnesses:
L. C. Hills
M. W. Twitchell
Inventor:
Wilbur Stephen Scudder,
by Marcellus Bailey
Attorney

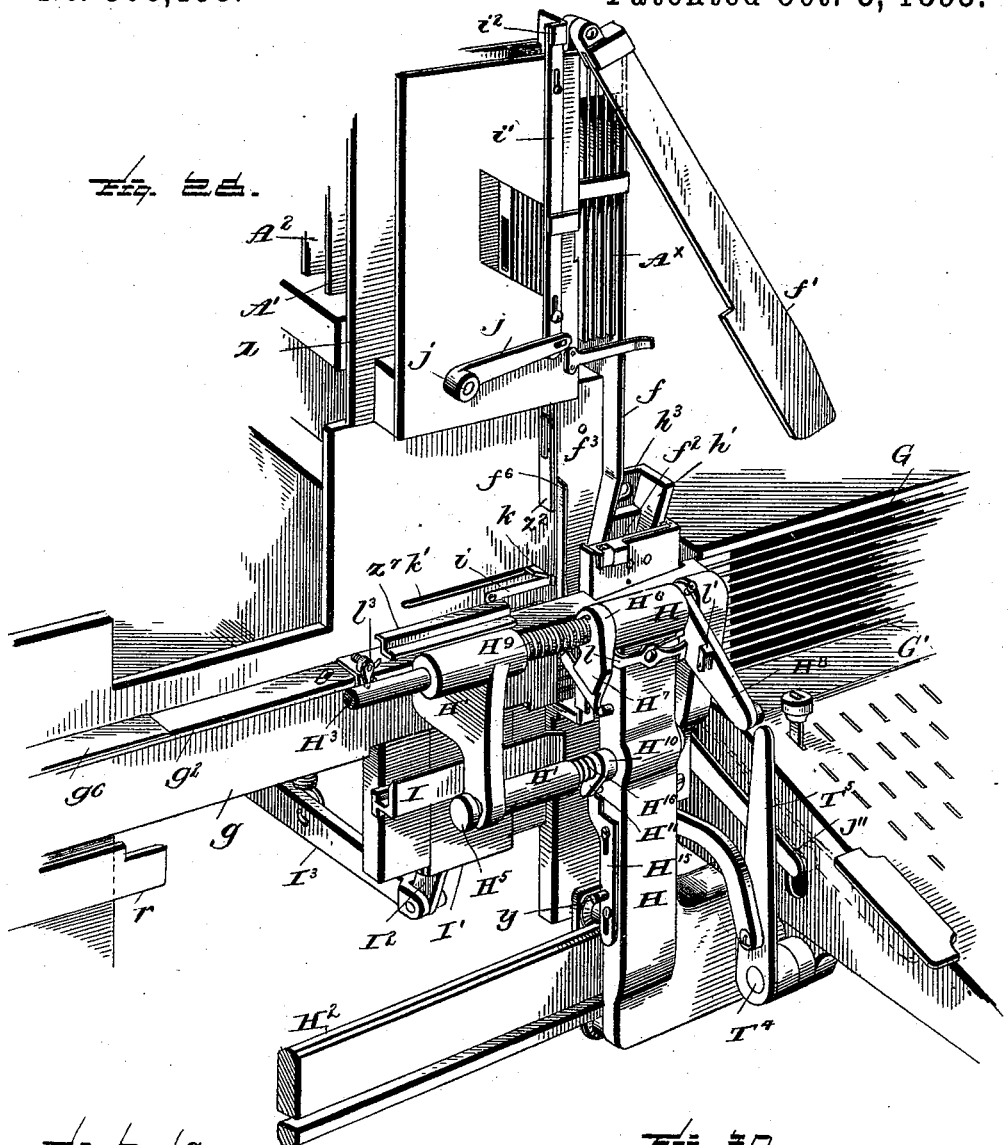
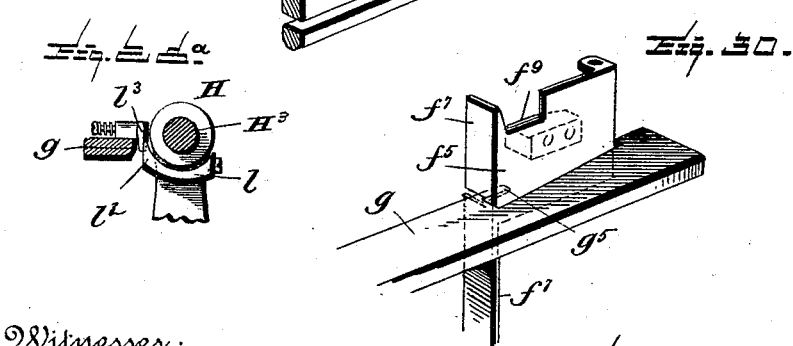

(No Model.) 17 Sheets—Sheet 11.
W. S. SCUDDER.
LINE CASTING MACHINE.
No. 506,198. Patented Oct. 3, 1893.
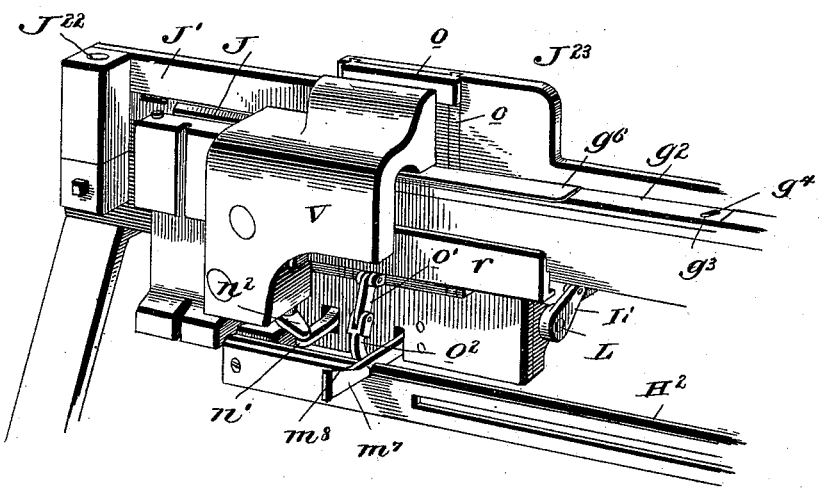
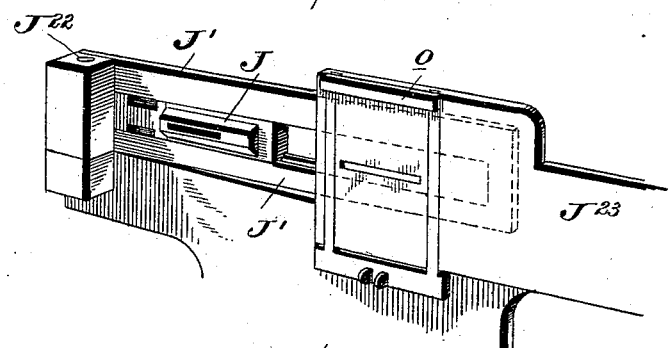
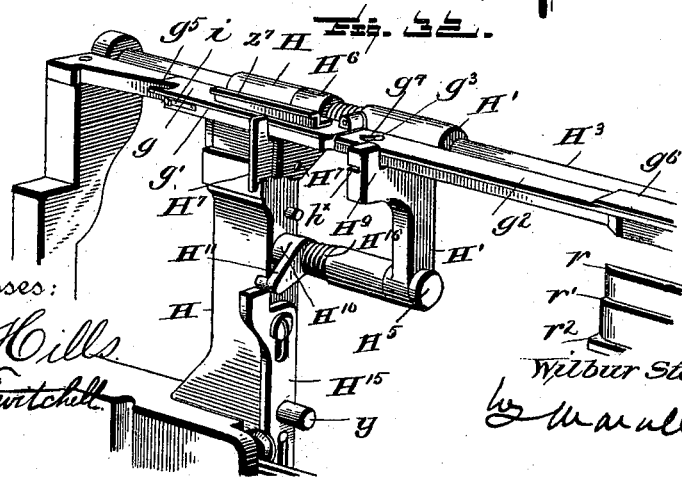
Witnesses:
L. C. Hills
M. W. Twitchell
Inventor:
Wilbur Stephen Scudder,
by Marcellus Bailey
Attorney (No Model.)  17 Sheets—Sheet 12.
W. S. SCUDDER.
LINE CASTING MACHINE.

No. 506,198. Patented Oct. 3, 1893.

Witnesses:
L. C. Hills.
M. N. Twitchell.

Inventor:
Wilbur Stephen Scudder,
by Macallus Bailey
Attorney.

(No Model.) 17 Sheets—Sheet 13.
W. S. SCUDDER.
LINE CASTING MACHINE.
No. 506,198. Patented Oct. 3, 1893.
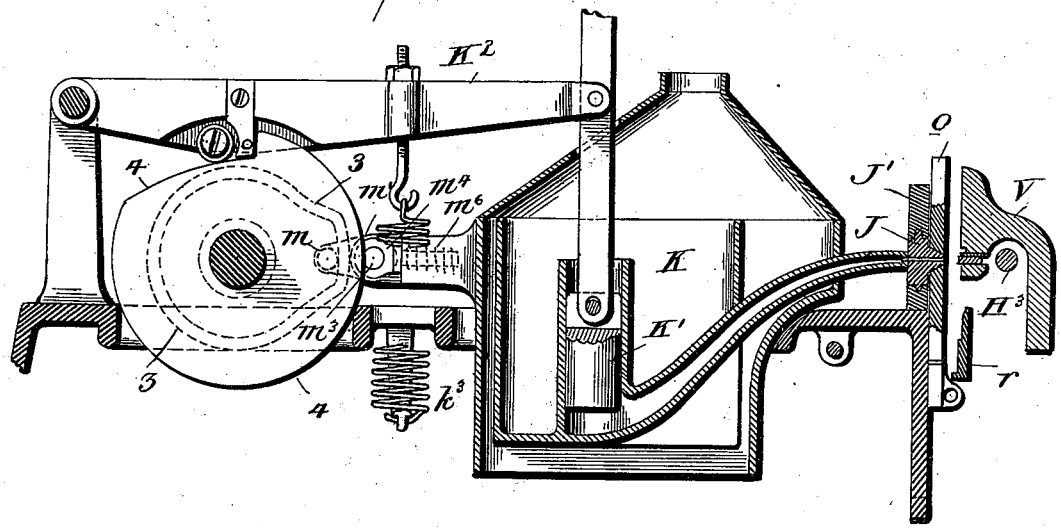
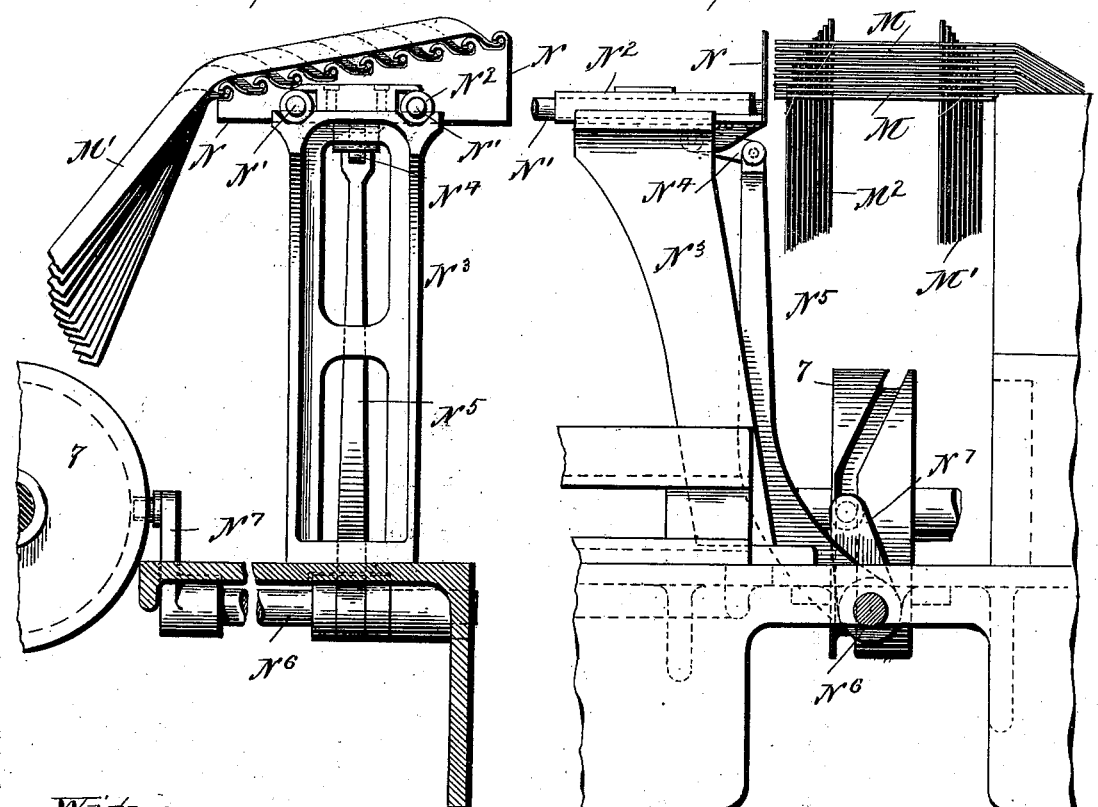
Witnesses:
L. C. Hills
M. H. Twitchell
Inventor:
Wilbur Stephen Scudder,
by Marcellus Bailey
Atty.

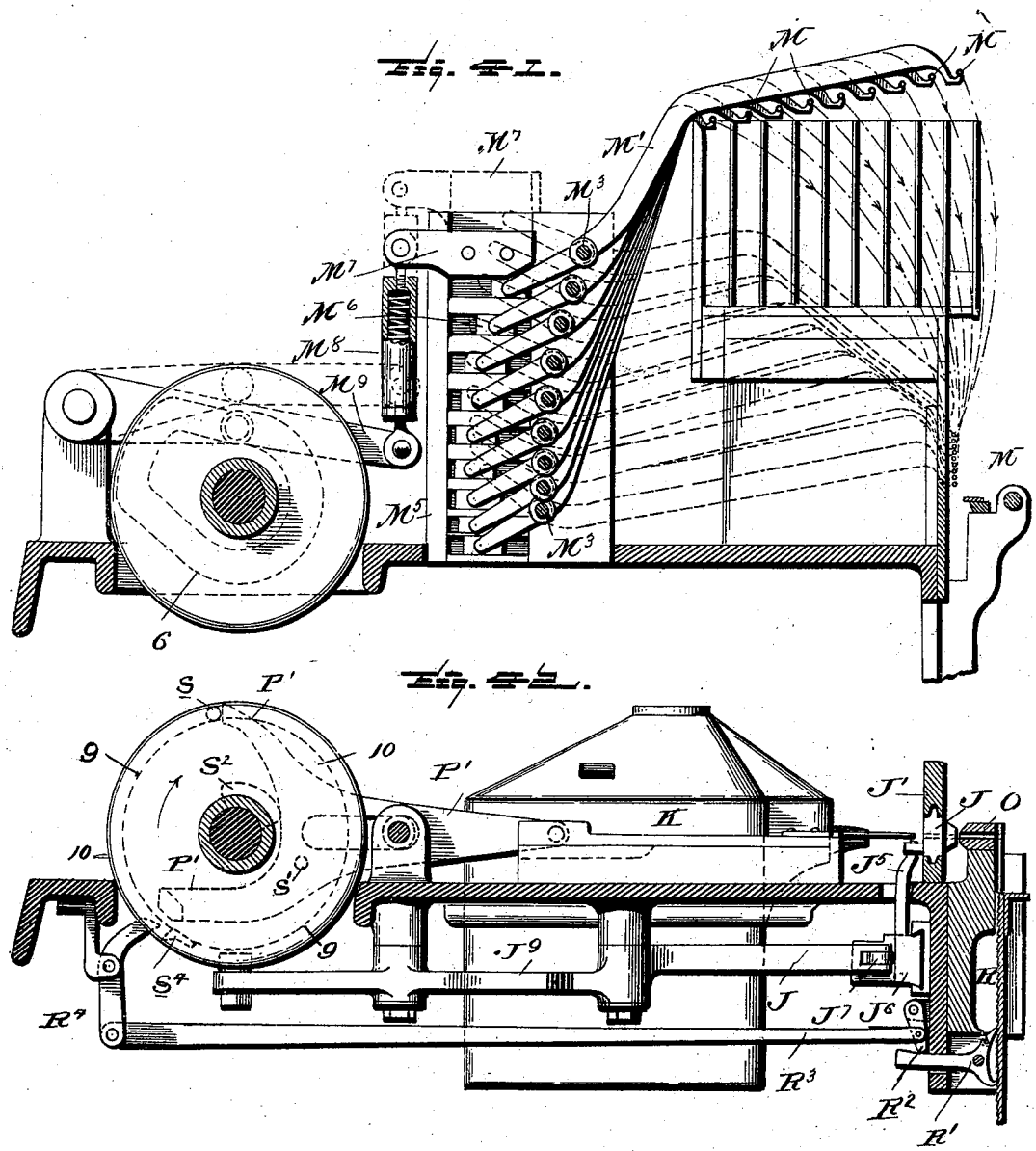

(No Model.)  17 Sheets—Sheet 15.
W. S. SCUDDER.
LINE CASTING MACHINE.
No. 506,198.  Patented Oct. 3, 1893.
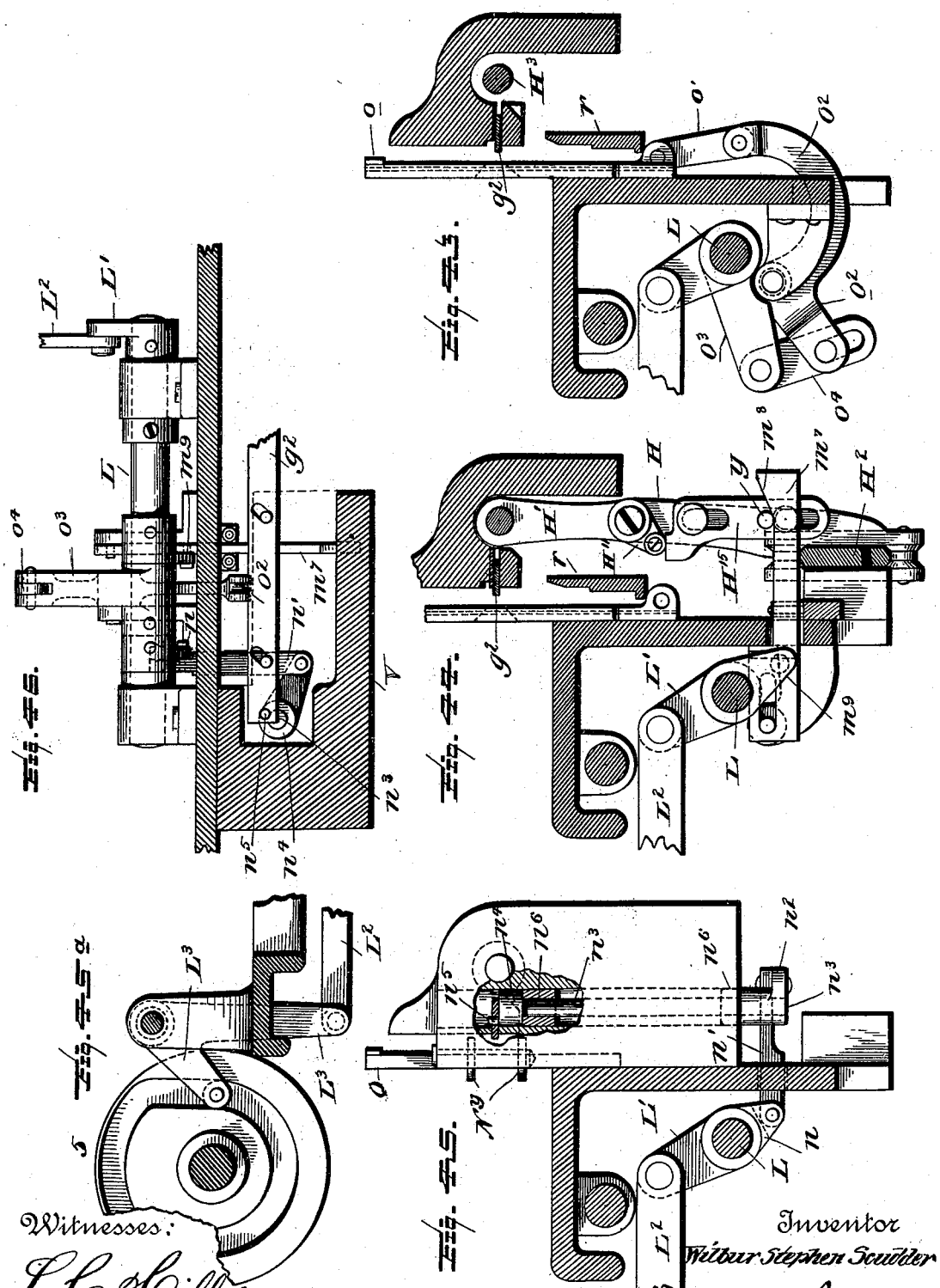
Witnesses:
L. C. Hills.
M. H. Twitchell.
Inventor
Wilbur Stephen Scudder
by Wacallur Bailey
Attorney

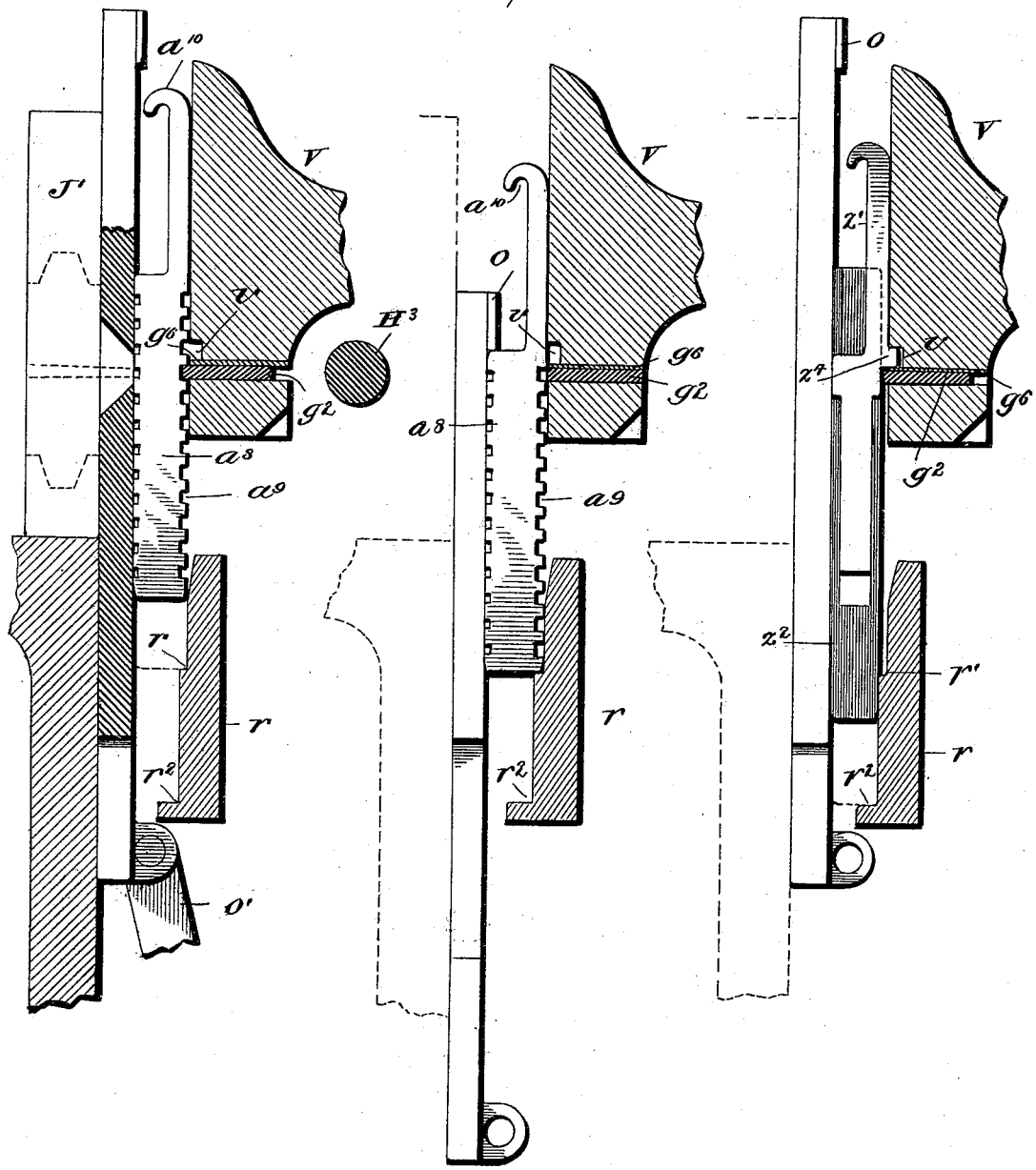

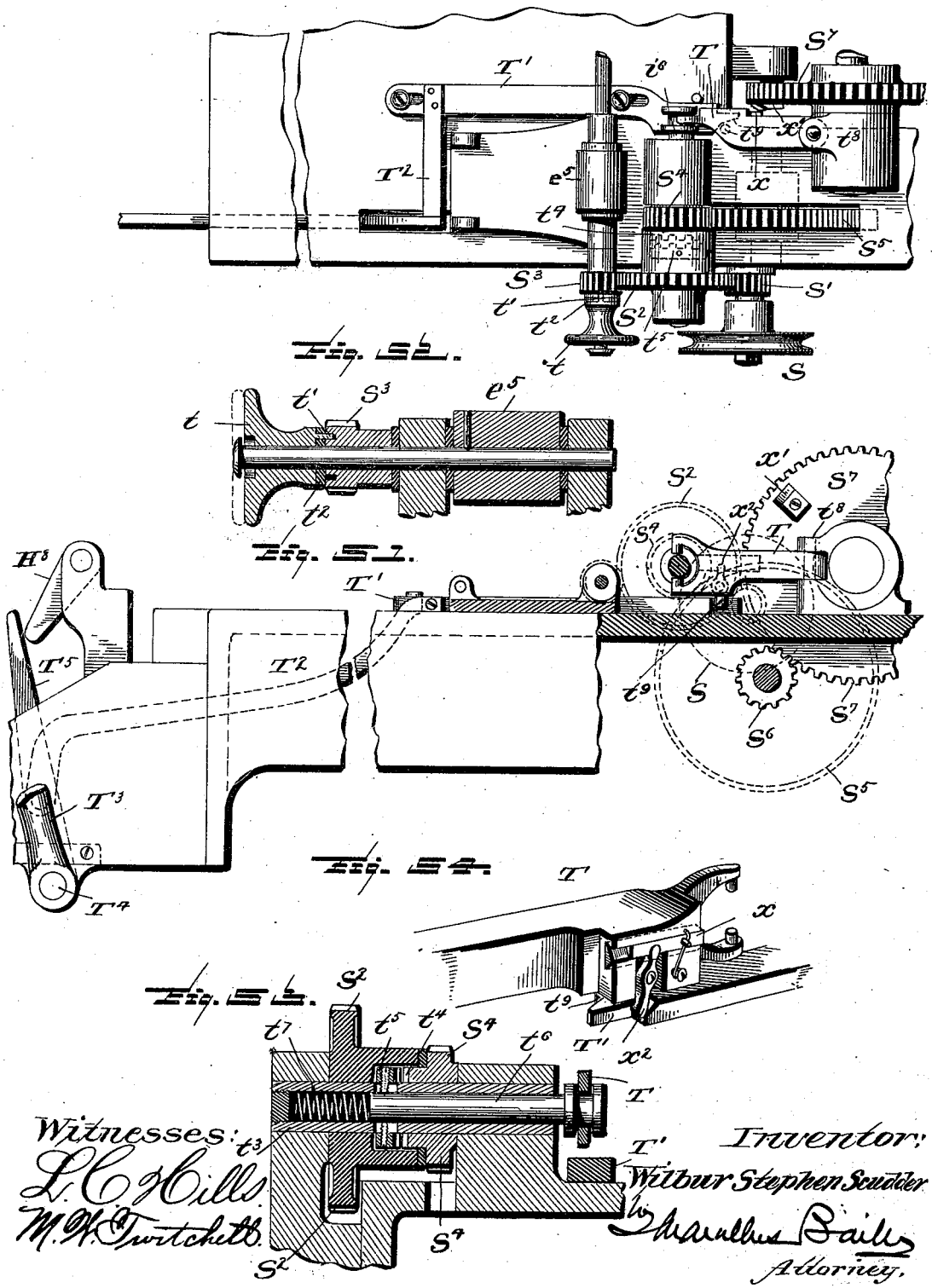

UNITED STATES PATENT OFFICE.

WILBUR STEPHEN SCUDDER, OF BROOKLYN, NEW YORK, ASSIGNOR TO THE MONOLINE COMPOSING COMPANY, OF WASHINGTON, DISTRICT OF COLUMBIA.

LINE-CASTING MACHINE.

SPECIFICATION forming part of Letters Patent No. 506,198, dated October 3, 1893.

Application filed August 23, 1893. Serial No. 483,851. (No model.)

*To all whom it may concern:*

Be it known that I, WILBUR STEPHEN SCUDDER, a citizen of the United States, and a resident of Brooklyn, in the State of New York, have invented certain new and useful Improvements in Line-Casting Machines, of which the following is a specification.

My invention relates to mechanism for producing bodies or slugs of metal, or other material, of suitable shape, carrying at one edge characters representing a line of words, figures, signs or any other characters which it may be desired to use in the art of printing. While the material operated on may be any material suitable for the purpose, I will, however, describe the machine, its mode of operation and resultant product, in connection with what is known as type-metal, which latter, in the operation of the machine, is cast in the form of bars or slugs, of proper length and height, which when assembled may be used to print from directly, or for the production of stereotype matrices.

The invention involves, generally speaking, two steps, viz: assembling a number of matrices in line, and impressing or reproducing the characters borne by those matrices in or upon a suitable material of proper consistency to take the impression, which steps are not new either separately considered or in combination. In the first essay in this direction, after the series of matrices had been assembled in line, the line of characters represented by those matrices were (as a stereotype itself or as a stereotype mold) reproduced by impressing the same upon or in a material of such nature and consistency as to receive and retain the impression—this method of making a stereotype or a stereotype mold being an old one, in a general sense, at the time the employment of a series of independent matrices to be assembled so as to bring their characters together in any desired sequence to produce therefrom a line of type matter, was first suggested and devised. Subsequently the reproduction of the line from such assembled matrices was effected by casting; the line of matrices closing one end of a mold, into the opposite end of which type metal was injected by means of a pump from a melting pot. This method of reproduction was an equally old one in a general way, and had before been employed for the making of type, or bars, which in some instances bore only one letter or character, and in other instances bore a plurality of characters.

Heretofore in machines of the kind in question, the matrices from which the line is to be formed have consisted each, either of a long bar bearing thereon in intaglio the entire alphabet or other characters to be used, or of a short bar having only a single letter or character in intaglio thereon. In the first system the necessarily great length of the matrix bars prevents their being handled and brought to the proper points to arrange their respective types to form the desired line of characters with accuracy and practicable speed; while in the second system the immense number of individual matrices to be stored and provided for demands a large and complicated machine.

The matrix bars I have devised differ materially from either of the foregoing. I do not use the single character matrices, nor on the other hand do I attempt to combine the entire series of characters upon one matrix bar. I have found that the various letters, or characters, can be divided into groups, each containing characters which may be conveniently borne by a single body piece or bar of uniform width and thickness throughout. For example, with ninety-six different letters and characters, I find that these can be divided into eight groups of twelve characters each, and that the characters of each group can be arranged, so as to fulfill all required printing conditions, upon a bar the body part of which may be and in practice is of uniform width and thickness. In this way I greatly reduce the number of different matrices as compared with the system in which single character matrices are used, employing only eight different species of matrix bars, against ninety-six which would be required in a single character matrix machine using that number of characters. I at the same time very materially cut down the length of the bars, as compared with the system in which long matrix bars, carrying each the whole assortment of characters, are used, and am enabled also to do away with the taper formation of the bars which is a necessity in the last named system when the bars are solid. They also can be, and are, entirely disconnected from the machine in which they are used, in the sense that, while delivered from their magazine, assembled, carried to the casting point, returned therefrom, and redistributed to their appropriate magazine compartments, they have no permanent connection, either with any portion of the mechanism by which this sequence of operations is effected, or indeed with any portion of the machine. They are simply loose, disconnected bars which by successive mechanisms are taken care of and caused to pass through a certain cycle of movement in the machine. My new bars themselves are narrow metallic strips, carrying on one edge a number of intaglio type—a convenient number being twelve, as hereinbefore suggested. Upon the opposite edge are notches coincident with the twelve letters, which notches are alike in every instance and for every matrix bar, and are intended for aligning purposes. From the upper end of each bar extends a hook; the hooks of the individual members of the same species have the same height, but as between the different species of bars the hooks of each differ in height from all of the others. This gives individuality to each group or species so far as the hooks are concerned (these hooks being selecting devices by means of which the bars can be caused to engage the devices by which they are returned to their respective magazine compartments), and secures accurate and ready distribution as will hereinafter appear. For the purpose of using these matrix bars, I have devised a machine which can best be explained and understood by reference to the drawings accompanying and forming part of this specification.

It is sufficient to say in the way of preliminary explanation, that it is a machine in which the matrices, after having been assembled in line, are conveyed to a point where the line is justified, and thence to a point where the type-bar is cast from the line; and that then they are returned to a point where they are distributed and carried back to their appropriate chambers in the magazine from which they were originally taken. The matrices are stored in a magazine having a separate chamber for each species. Each chamber is closed by a gate which controls the delivery of the matrices therefrom, and the gates are operated and controlled by a system of levers and keys. The key-board, of course, has as many keys as there are letters or characters—which we will suppose to be ninety-six; but as these characters are divided into groups of twelve, one for each species (eight in all) of the matrix bars, then twelve keys, representing the several characters of any one group, must each one individually control one and the same gate appropriate to the magazine chamber containing the species of matrix bars by which this group is borne. The matrix bars, as they are delivered, drop into an assembly box from which they are pushed one at a time by an ejector, which thrusts them forward into a race-way bordered on one edge by an aligning bar that enters the appropriate aligning notch on one edge of the matrix bar. Manifestly, however, the matrix in its downward movement must be arrested at that point which will bring the proper notch in line with the aligning bar,—that is to say if the fifth character on the matrix bar is the one called for, the matrix bar in dropping must be arrested when the aligning notch appropriate to the fifth character is opposite the aligning bar, and so on for the other characters on that matrix bar. To this end I provide a series of stop bars, twelve in number (that is to say the same in number as the characters which compose a group), arranged at different heights corresponding to the difference in height of the aligning notches on the matrix bar, and arranged so that any one of them can be projected temporarily into the path of the movement of the matrix bar, to arrest the latter at any desired point in its descent. The fifth stop bar for example will arrest any one of the whole series of matrix bars at a point to bring its fifth character into the line to be formed. This movement of the stop bars is brought about by the keys, each of which operates upon that stop bar which corresponds in position to the position, upon the matrix bar, of the character appropriate to the key. That is to say every key (and there will be eight of them) which represents the fifth character on any matrix bar, will act on the fifth stop bar, and so on. I may here remark that space bands or spacers are introduced at proper points in the line as the composition of the latter goes on. These spacers have a compartment of their own in the magazine and drop directly down therefrom. After having dropped, they are thrust forward into place by the same ejector which pushes forward the matrix bars; but their path of descent is a little in advance of that of the latter, so that they may clear the stop bars, which are intended only for the matrix bars. The spacers all drop to a uniform level, and they are provided with shoulders by which they rest on top of the aligning bar. They are delivered by means of appropriate mechanism controlled by a space key on or alongside of the key-board.

The spacer I prefer to use is made in accordance with my United States Letters Patent No. 494,899 of April 4, 1893, consisting of a lower expander section which enters between the cheek pieces of an upper section and is longitudinally movable between the same for the purpose of expanding or spreading them apart, the upper section having on it a hook for distributing purposes. At the assembling point there is provided a carriage in which the line when it is formed is received and locked up, this carriage being combined with mechanism for causing it to traverse a race-way in which the line moves to and from the casting point. Along the line of the race-way is located, just beyond the assembly point, a justifying mechanism comprising a shoe by which the lower movable sections of the spacers are lifted together so as to expand the line uniformly, and means for imparting movement to the shoe at the time the line has been brought to it by the line carriage. At this point there is a flange along the line of the race-way which overhangs shoulders or lugs on the upper sections of the spacers, so as to hold those sections down in place while the under expander sections are being acted on and pushed upward by the justifying shoe. From the justifier, the line moves along in the race-way to the mold where the slug is cast, the line closing one end of the mold, and the metal, by any known and suitable mechanism, being injected into the mold from its other end. At this point is located a mechanism by which, after the casting operation is concluded, the carriage is caused to loosen slightly its hold on the line, the aligning bar (which at this point is movable) is retracted from the aligning notches of the matrix bars, and then all of the matrix bars are pushed down so as to bring their heels or lower ends in the same horizontal plane, thus leaving the hooks on their upper ends at different heights relatively to one another according to the different species of matrix bars which enter into the composition of the line. At the same time the depressor pushes down the lower sections of the spacers previously raised by the justifier, thus returning all the spacers to normal condition. Between the casting point and the justifier, and along the line of the race-way, is located the distributer composed of a series of levers, carrying at their outer ends horizontal carriers or wires (one for each species of matrix bar, and one for the spacers) which, when the levers are down, arrange themselves one above the other in the plane of the race-way at heights corresponding to the heights of the hooks they are to engage. When, on the other hand, the levers are up, the wires arrange themselves in an approximately horizontal plane each one in line with a wire or guide leading to the particular magazine chamber appropriate to its distributer wire. With this mechanism is combined a pusher which, when the distributer wires are up, wipes along these wires, and pushes forward the matrix bars and spacers which may happen to be hanging on them into their respective magazine chambers. Thus, when the carriage returns from the casting point, after the matrix bars and spacers have been acted on by the depressor, the hooks on the bars and spacers will string themselves on their respective distributer wires, these wires will be at once raised by their levers, carrying along the bars and spacers which hang from them, and, when the distributer wires register with the guide wires of the magazine chambers, the pusher will act to push the bars and spacers forward on the wires thus returning them to the chambers from which they were originally taken. The carriage then returns to the assembling point. Beyond the casting point is mechanism by which, after the casting operation has been effected, and during the return movement of the carriage, the slug is trimmed and ejected from the mold on to the galley. This mechanism, however, as well as many other details which have not been mentioned in the forgoing general description of the machine, will be set out in the course of the more minute description which I shall now proceed to give by reference to the accompanying drawings, in which—

Figure 7:
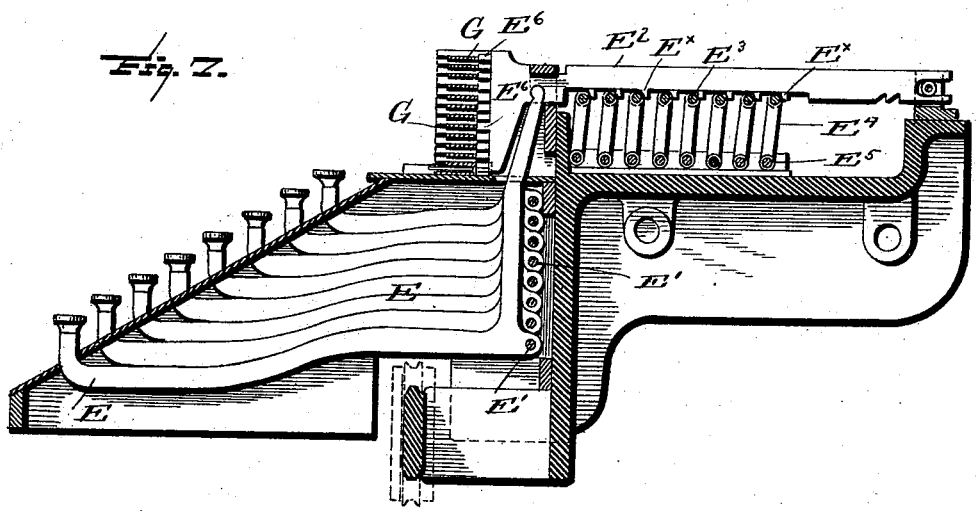
Figure 35:
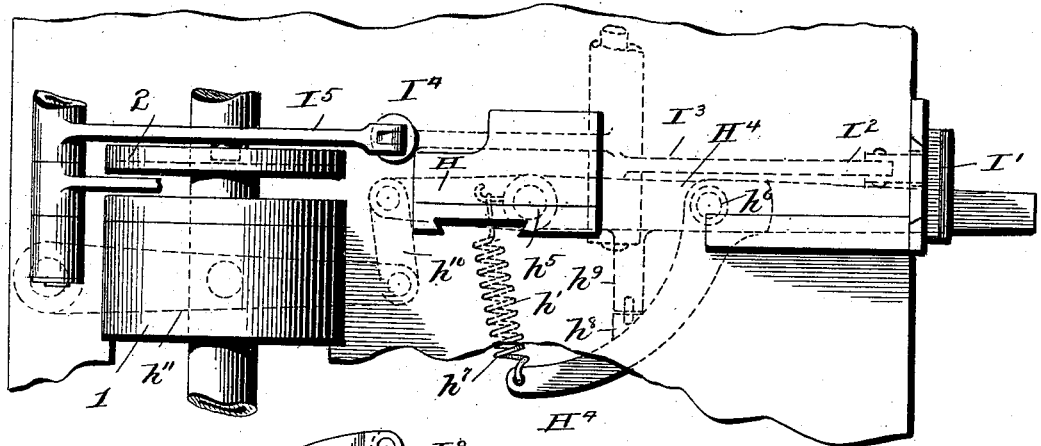
Figure 36:
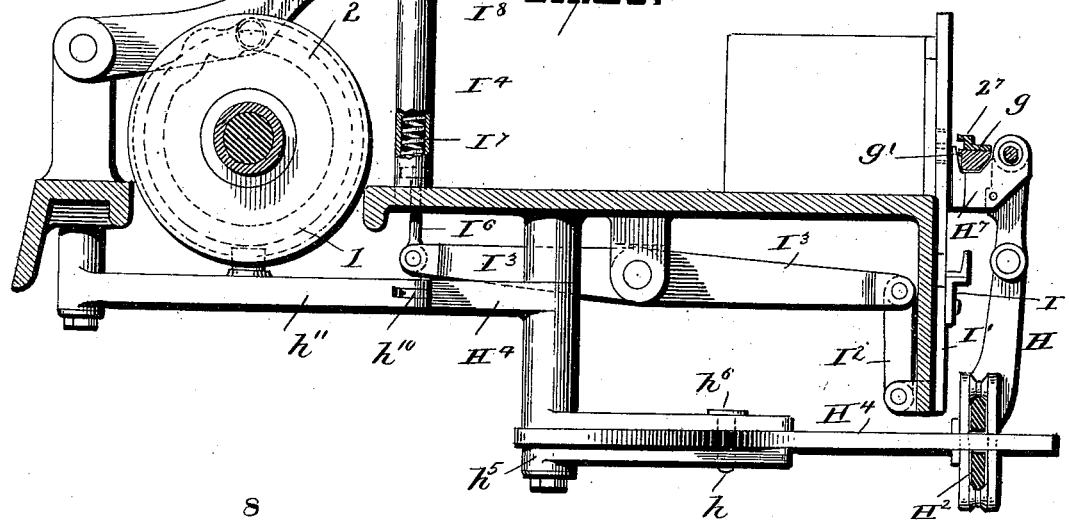
Figure 37:
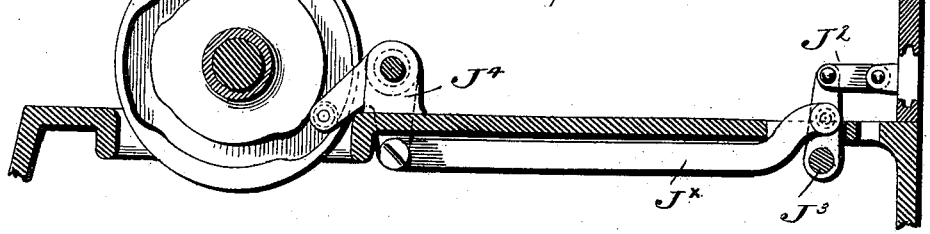

Figure 1 is a face and edge view respectively of each of the matrix bars, which compose the series used in the machine. Fig. 2 is a like view of one of the spacers—representing it on the left of the figure in extended condition, and on the right in the condition in which it is when the lower section is pushed up into the upper one. Fig. 3 is a plan view of the machine. Fig. 4 is a front elevation, and Fig. 5 is a right end elevation of the same. The remaining figures are on a larger scale and illustrate the details of the various mechanisms of which the machine is composed. Fig. 6 is a plan view of the key-board. Fig. 7 is a sectional elevation on line 7—7 Fig. 6. Fig. 8 is a vertical section of the magazine through and lengthwise of one of the matrix bar chambers. Fig. 9 is a top view of the magazine divested of moving parts. Fig. 10 is an elevation of the magazine from the right end of the machine, illustrating the matrix bar delivery mechanism. Fig. 11 is a sectional elevation of the magazine and some of its attached parts looking from the right end of the machine, and intended to illustrate more fully the arrangement of the matrix bar delivery gates and their operating mechanism. In this figure only one of the matrix bar magazine chambers is shown provided with a vibrator—this being in order to avoid multiplying parts. Fig. 12 is a section taken vertically, and lengthwise of the machine, through the assembly box. Fig. 13 is a horizontal section through the assembly box, intended to show the means by which the ejector which discharges the delivered bars from the assembly box is actuated. In this figure I have represented in outline the magazine, and have also represented the connections for the vibrator shaft which extends cross-wise of the chambers in the magazine. Only the rear half of the assembly box is shown, and the rear jaw is represented as pushed back by the ejector which is in its advanced position. Fig. 14 is a perspective view, and Fig. 15 is a horizontal section of the assembly box. Fig. 16 is an enlarged section of the pawl which enters the assembly box, and serves to catch the delivered matrix bar and prevent it from getting out of place. Fig. 17 is a sectional end elevation representing the space magazine and delivery mechanism. Fig. 18 is a plan showing the lever or toggle arm connection, between the space key lever, and the vertical rod which operates the space delivery detent. Fig. 19 is a transverse vertical section of the space magazine, looking toward the front of it. Fig. 20 is a front elevation of the space magazine. Fig. 21 is a like elevation of a part of the space chamber with the front plate removed, leaving the various devices which directly control the delivery of the spacer. Fig. 22 is a perspective view of a portion of the interior of the space magazine, looking at that side of it which is entered by the space lifter. Fig. 23 is a perspective view intended to represent more clearly the form and relative arrangement of the spacer retaining plate, and the shoe by which the lifter is prevented from raising more than one spacer at a time. Fig. 24 is a face view and edge view of the plate which bounds the rear side of the raceway at the point where the line is assembled, showing projecting from it in the face view the fingers and the hooks between which the line is assembled. Fig. 25 is a horizontal sectional plan of the fingers and their controlling devices. Fig. 26 is an elevation of the same looking at them from the rear. Fig. 27 is a section on line 27—27, Fig. 25. Fig. 28 is a perspective view, looking from the front, of the line carriage and parts adjoining it—this view showing in a general way the assembling mechanism, and also the justifier. Fig. 28$^a$ is a cross section, showing the manner in which the tail of the latch on the line carriage for controlling the line locking lever, engages the trip pawl on the aligning rail. Fig. 29 is a front elevation on a larger scale of that part of the main carriage H in which are located the ratcheted hub and sleeves by the action of which the two parts of the carriage are spread apart to loosen their hold on the line. Fig. 30 is an enlarged perspective view of the outer jaw of the assembly box, and the adjoining portion of the aligning rail, intended to show how the aligning rib enters the assembly box, so that the proper aligning notch on the matrix bar can engage the aligning rib, before the bar is ejected from the assembly box. Fig. 31 is a plan of this portion of the aligning rail showing the jaw in section. Fig. 32 is a perspective view of the line carriage looking from the rear—showing also the aligning rail which bounds the front of the race-way in which the line moves. In this figure the movable wing which closes against the rear of the line is represented in the position it occupies when swung up into the race-way. There is also represented the end of the stepped shoe by which the line on its return from the casting point is supported until it is taken by the distributer. Fig. 33 is a perspective view of the front portion of the machine at and near the casting point. Fig. 34 is a perspective view of the mold, the mold guide bar, and the line depressor. Fig. 35 is a plan representing the justifier connections, and also showing the construction of the line carriage lever. I omit from this figure the cam groove of cam 1, this being plainly shown in Fig. 3. Fig. 36 is a transverse vertical section showing the justifier connections. Fig. 37 is a transverse vertical section showing the mechanism for moving the mold guide bar out and in. Fig. 38 is a transverse vertical section, showing the line locked up and clamped and the parts in position they take at the time the line is cast—the piston of the ejecting pump having just dropped to force the metal from the pot into the mold. Fig. 39 is a front elevation of the upper part of the distributer wires and the upper ends of their supporting lever, and shows also the pushing mechanism complete. Fig. 40 is a side elevation of the pusher, looking at it from the left of the machine. Fig. 41 is a transverse vertical section of the distributer, looking toward the magazine. Fig. 42 is a transverse vertical section through the slug ejecting mechanism, mold, mold guide bar, and galley—showing also the connections by which the mold is caused to slide back and forth in its guide bar. Fig. 43 is a transverse vertical section showing the connections for operating the line depressor, which, at the casting point, and after the casting operation, depresses the matrix bars and spaces to predetermined levels. Fig. 44 is a like section showing the connections by which the two parts of the line carriage at this time are spread apart so as to loosen their hold on the line. Fig. 45 is a like section showing the connections by which the aligning bar at this time is withdrawn from the aligning notches of the matrix bars, so as to permit these bars to be pushed down by the depressor. Fig. 45$^a$ is a like section of the rear part of the machine where the cam is located which actuates the auxiliary shaft from which the several movements of the line depressing, carriage-spreading, and aligning-bar-operating mechanisms are obtained. Fig. 46 is a plan showing the auxiliary shaft, and also the aligning-bar-operating mechanism. Figs. 47, 48 and 49 are much enlarged cross sections through the anvil and opposed parts between which the line is brought at the casting point. In Fig. 47 the aligning bar is represented as projected and engaging a matrix. In Fig. 48 the aligning bar is represented as withdrawn from engagement with the matrix. In Fig. 49 a spacer is represented as entered in the groove formed in the anvil for the lug on its outer edge, and as being still held there (although the aligning bar is retracted) by the thin stationary strip just over the aligning bar, which bounds the bottom of the groove in which the lug on the spacer is received. Fig. 50 is a plan of the stopping and starting mechanism. Fig. 51 is a transverse section of the same, representing some of the chain of gearing in dotted lines. Fig. 52 is a sectional detail of the stopping device for the friction roller which operates the main bell crank lever of the delivery and assembly mechanisms. Fig. 53 is a longitudinal axial section enlarged of the clutch through which motion is transmitted from the driving pulley to the line shaft at the rear of the machine. Fig. 54 is an enlarged perspective view of the shipping lever for controlling the last named clutch, looking at the lever from the side opposite that shown in elevation in Fig. 51, showing also a part of the slide bar for operating said lever.

With a view to avoid obscuring the drawings, I have, in those figures which are general views of the machine, placed reference letters and numerals for the most part only on the more prominent portions of the several mechanisms. Those letters and numerals of reference which designate minor parts and structural details, have been confined to those figures in which those details are illustrated upon a larger scale.

*Matrix bars and spacers.*—The machine is supposed to be adapted for ninety-six characters—these characters being divided into eight groups of twelve each. Consequently there are eight species of matrix bars. One of each is represented in front and edge elevation in Fig. 1, $a'$ to $a^8$ inclusive. Each bar has a hook $a^{10}$ differing in length from the others, and each has on its rear edge aligning notches $a^9$, corresponding in number and position to the intaglio type on the front edge. The matrix bars differ in thickness as between one another, as shown by comparison of the edge views, each being preferably some aliquot part of the thickest one which is that of the standard em. The spacer I prefer to use is represented in front and edge elevation in Fig. 2. It is composed of the two sections $z'$ $z^2$ put together and combined for joint operation in the manner set forth in my United States Letters Patent No. 494,899, of April 4, 1893. The upper section has a hook $z^3$ and, on its rear edge, a lug $z^4$.

*Magazine, delivery mechanism and keyboard.*—The magazine for containing the supply of matrix bars and spacers is a box-like structure divided by vertical partitions, running lengthwise of the machine, into eight matrix bar chambers $A'$ to $A^8$ inclusive, Fig. 9 and a spacer chamber Z. In the upper part, and extending lengthwise, of each chamber is a supporting guide wire $d^x$, Fig. 8 upon which the matrix bars and spacers hang by their hooks, these wires inclining downward toward the delivery end. Each matrix bar chamber terminates at the delivery end in a separate narrow channel or passage A Fig. 9, which extends to the delivery point $A^x$ in a line at right angles to its chamber. The matrix bars as they pass along down their supporting wires $d^x$ enter their delivery channels A, and are then fed forward therein, one by one, to the delivery point at the front edge of the channel, whence they are delivered to the assembly box below. They are thus fed and delivered by reciprocatory "delivery gates" C, Fig. 11, of which there is one gate for each separate channel. The body of the gate is horizontal, moving beneath the floor of the channel which it controls, but having its front end $c$ at the delivery point projecting beyond that floor, and forming a shelf or gate proper which closes the opening down through which the matrix bar would otherwise drop. The matrix bars in each channel are advanced until the front matrix bar rests on the shelf $c$. Consequently when the gate C is drawn back, its shelf $c$ will be retracted and the matrix bar before supported by it will now drop. The gate C is provided with a thin upright finger $C'$ Fig. 11, which also moves in the channel. When the gate moves back, the finger, moving with it, travels back past the mouth of the matrix bar chamber communicating with the channel, thus allowing another matrix to pass from the chamber into the channel; and when the gate again moves forward the finger, moving with it, pushes forward the line of matrix bars, thus bringing a fresh one upon the shelf $c$ to take the place of the one previously delivered. Each gate C is individually spring retracted as indicated at $c'$ Fig. 10 and it is held in advanced position against the stress of its spring by a pivoted detent lever D, Fig. 11, the upper end of which engages a lug $c^2$ on the under side of the gate. In each channel and directly over the matrix to be delivered is the front end of what I call an accelerating lever $d$, which is of angle form pivoted at its elbow to the frame of the magazine and having its rear end engaged and restrained by a retaining lug $c^3$ on the top edge of the gate for that channel in which the accelerating lever is located. The lever is spring pulled at $d'$, the tendency of the spring being to depress the front end of the lever. Whenever the gate C is released it will at once be drawn back by its spring. The accelerating lever, being spring-drawn also, will follow the delivery gate a short distance, at which time its front end will rest upon top of the front matrix in the channel. It will there rest until the shelf $c$ of the delivery gate has withdrawn from under the matrix, at which time the accelerator under the stress of its spring will give the matrix an active start, shooting it down into the assembly box below. Each delivery gate is slotted longitudinally at front and rear to receive guide rollers on which it runs. In order to return the delivery gate to its advanced position, against the pull of the spring, I make use of the following arrangement: In rear of the series of gates is a bell crank lever frame $e$ Fig. 3 pivoted at $e'$, Fig. 10 having at its end opposite the heels of the gates C a cross rod $e^2$ against which any one of the gates when retracted will strike, and thus will move the lever on its pivot. At the other end of the bell crank is a rotatable cam $e^3$, which is designed, when depressed, to come into contact with and be operated by the continuously revolving roller $e^5$ which latter is rubber faced in order to insure the friction requisite to cause the revolution of the cam. Under this arrangement, whenever any one of the gates springs back, it will force and move the lever $e$ in a direction to bring the cam $e^3$ into contact with the roller $e^5$. As soon, however, as this takes place, the cam is forced to revolve with the roller, and in so doing it moves the lever $e$ back, thus forcing the gate C forward until the latter is again caught and held by the detent lever D. The cam $e^3$ is so shaped that after it meets the roller it, during the first portion of its revolution, does not raise the bell crank lever, having during this portion of the revolution a delay surface of circular contour. This is to give the delivered matrix bar time to get fully out of the magazine, and into its ultimate position in the assembly box, and then the swell of the cam meets the roller and returns the bell crank lever quickly to its normal position. At this point I remark that, with a view to keeping the matrix bars well down upon the wires from which they hang in their magazine chambers, I make use of vibrators $d^2$, (Fig. 8,) one for each chamber, these vibrators being arms which extend over, and in line with, the matrix-bar supporting wires, and are operated on by fingers $d^3$ made fast to a rock shaft $d^4$ Fig. 11 supported in proper bearings crosswise of the matrix bar chambers, this shaft having a crank connection $d^5$, $d^6$, $d^7$, with the axle or pivot of the angle lever $e$, whereby it receives a rocking movement whenever the lever vibrates. The vibrators $d^2$ Fig. 8 bear only on the foremost matrix bar or bars of their respective chambers, and are so arranged that when they are down in normal position they are not pressed by the vibrating fingers $d^3$; but whenever any matrix bar at the front of the chamber becomes disarranged or lifted from normal position it raises its vibrator $d^2$ thus bringing the latter up into the path of its finger $d^3$ which, in moving, will consequently bear down on the vibrator with the effect of causing the latter to bring the matrix bar beneath back into normal position.

In order to complete the description of the magazine (so far as the matrix bar chambers are concerned), and of the means for delivering the matrix bars therefrom, it remains to describe the means by which the detent levers D, (one for each gate C) are operated; and this involves a description of the key-board (Figs. 3, 4, 5, 6, and 7).

Inasmuch as we have supposed that the series of matrix bars carry altogether an assortment of ninety-six different characters, then there must be ninety-six different keys, or one for each character. These I prefer to arrange, as shown in Fig. 6, in eight longitudinal rows of twelve each. But as the characters are divided into groups of twelve, a different group being carried by each different species of matrix bar, it follows that as each species is contained in a separate chamber controlled by a separate gate of its own, then necessarily twelve keys, appropriate to the twelve characters of any one group, must each be capable of independently controlling one and the same delivery gate. This I provide for as follows: The key buttons are upon the outer ends of elbow levers E Fig. 7 pivoted upon shafts E'. The extremities of their vertical arms are rounded, so as to fit in correspondingly shaped recesses in the under edges of the horizontal slide bars $E^2$, one for each key lever. These slide bars move in suitable guide ways in the key-board frame, and are spring retracted in any suitable way. Immediately below and extending cross-wise of the slide bars, are the bail rods $E^3$ which for convenience and ease of movement are by links $E^4$ connected to pivots $E^5$ on which they may swing back and forth. There are eight of these bail rods—one for each gate C; and each bail rod by a link D' Fig. 10 is connected to the lower vertical arm of its appropriate detent lever D. Each slide bar has on its under side a lug $E^\times$ Fig. 7, in such position as to engage any selected one of the bail rods. If, for example, the key to which the slide bar pertains represents a character of the group carried by the matrix bar in the fifth magazine chamber, then the lug $E^\times$ of the slide bar should be so positioned as to engage that bail rod which influences the detent lever of the gate for the fifth magazine chamber; and so on. Thus, on depressing that key, its slide bar will by its lug pull forward the bail rod connected to the detent lever of the fifth gate, which latter consequently will be operated, in the manner hereinbefore described, to deliver a matrix bar, or rather to allow it to drop; in other words the keys representing the characters on any one matrix, all operate the same bail. Manifestly, however, means must be provided by which the descent of the matrix bar shall be arrested; and it is equally manifest that the point at which the bar is arrested cannot be invariably the same; otherwise only one of the characters on it would ever be presented in line, no matter what key caused its delivery. Consequently means should be provided by which the bar in its descent can be arrested at any desired point; there should be as many different levels at which its downward course may be arrested, as there are characters upon it; and the key which releases the matrix bar should also control the mechanism by which the movement of the delivered bar is arrested at that level which corresponds to the height, or position, upon the bar of the particular character represented by the key. Such a means is found in the devices, termed by me stop bars, shown at G, Fig. 4. These stop bars are thin flat blades of metal, arranged horizontally one above the other in a suitable comb-like frame Figs. 6, 7, which supports them near their ends. They are separated by an interval one from the other, and are held to their supports by roller studs $G^2$ Fig. 6 on the latter, which enter oblique slots $G^3$ in the stop bars, the arrangement and obliquity of the slots being such that when pressure is applied to the bars from their rear edges, they will thereby be not only moved toward the front of the machine but also longitudinally or lengthwise of the machine and in a direction to bring their projecting stop ends $G^4$ directly across the path of movement of the descending matrix bars. There are twelve stop bars. The lowermost one $G'$ Figs. 12, 14, represents the lowest point to which any matrix bar can drop, that being the point at which the topmost character of any bar is brought into the assembled impression line. This stop therefore need not be movable; it can be fixed, and is so shown. Each of the eleven bars above it, however, is movable in the direction and sense already indicated; and each one of them, from below up, represents a character successively, from the topmost character down, on the matrix bar. Normally the movable stop bars stand retracted or out of the path of movement of the descending matrix bars. Each slide bar $E^2$, Fig. 7 however, has on its head or front end, a teat or projection $E^6$ suitably located to strike the stop bar appropriate to that slide bar (when the latter moves in a direction to cause the delivery of a matrix bar) and by so doing to force its stop end to move into the path of the descending matrix bar. If for example the stop bar represents the fifth character of any group on any one of the series of matrix bars (and there are twelve such stop bars for the assembly of ninety-six slide bars) then the teat or projection $E^6$ on every such slide bar should be so located as to project into the path of the delivered matrix bar the stop which will arrest that matrix bar at a point where its fifth character will be brought into the impression line which is in process of composition. To withdraw any stop bar from its projected to its normal retracted position, I make use of the following arrangement: A comb-like yoke $G^5$, Figs. 3, 10, loosely surrounds the stop bars, near their projecting stop ends, and is connected to a connecting rod $G^7$ by a link $G^6$ jointed to the yoke on a vertical axis and to the arm on a horizontal axis (Fig. 10). The connecting rod $G^7$ has a longitudinal slot $G^8$ through which passes the axle of the cam $e^3$ which axle for this purpose is extended laterally beyond its bearing in the bell crank $e$. Upon the axle is fixed a small cam $e^6$ which is designed to act at a proper time upon a roller stud $G^9$ on the connecting rod $G^7$. When any stop bar is moved forward it will carry with it the yoke $G^5$ and in this way the connecting rod $G^7$ will be drawn forward until the rear end of its slot $G^8$ about reaches the cam $e^6$. This takes place upon release of the gate and consequent delivery of the matrix bar, which is arrested in proper position by the stop bar, when the matrix bar is at once taken care of by other instrumentalities which presently will be described. But by the rearward vibration of the bell crank $e$ consequent upon this delivery movement of the gate, its cam $e^3$ has reached the rotating roller $e^5$ and has been actuated thereby to return the lever to normal. This rotary movement of the cam $e^3$ causes a corresponding movement of the cam $e^6$ which wipes against the roller stud $G^9$ with the effect of retracting connecting rod $G^7$, consequently returning the stop bar, through the agency of the yoke $G^5$, to its original position.

I desire here to note one characteristic of the key-board, which is of material value. The slide bars $E^2$ Fig. 7, are alike in every respect save in the projections with which they are provided to engage the bail rods and the stop bars respectively. They can be placed at any point in their supporting frame—that is to say, the fifth can be placed where the twentieth now is, and so on—and yet will always affect the same bail rod and the same stop bar. This gives me in effect an interchangeable key-board—the slide bars being interchangeable with one another, so that any key can be made to represent, and control the delivery of, any character. This permits any desired grouping and relative positioning of the keys on the key-board, a feature which I find of great convenience, inasmuch as it renders the machine available to the large and increasing class of type-writer operators some of whom use key-boards arranged in one way, and others use key-boards arranged in a different way. Any such operator using the machine can readily arrange and adjust his key-board to conform to the arrangement of the key-board of the type-writer which he has been accustomed to operate.

*Assembly box and assembling mechanism.*—The matrix bars, delivered by the instrumentalities already described, fall from the magazine into what I term an assembly box, from which each one, as it is received therein, is discharged or ejected into a race-way, along which are located the justifying, distributing and casting mechanisms. This assembly box, best shown in Figs. 12 to 16 inclusive and Figs. 28, 30, 31, is directly under the delivery point $A^\times$ Fig. 28 of the several channels which lead from the magazine chambers. At its right hand end it is bounded by a stationary inclined strip $f$ which serves to surely direct the falling matrices to the stops; on its front face it is covered above with a glass strip $f'$, which in Fig. 28 is represented as turned to one side so as to fully expose the parts within, and below the glass strip by a stationary metal piece $f^2$ Fig. 14; the opposite face of the box is formed by a stationary plate $f^3$; and the discharge end of the box is formed by the spring closed jaws $f^4$, $f^5$, which are hinged on vertical pivots to a stationary cross plate $f^{10}$, and have their front ends bent at right angles inwardly, or toward each other, as seen at $f^6$, $f^7$, the part $f^6$ extending some distance upward, and the part $f^7$ extending down nearly to the bottom of the assembly box as seen in Fig. 14, so that when the jaws are closed these angularly bent ends will in effect close the discharge end of the assembly box. The jaws $f^4$, $f^5$, are upon the exterior opposite faces of the stationary sides $f^3$, $f^2$, of the box. The angularly bent end $f^7$ of the outer jaw $f^5$ passes around the front edge of the outer plate $f^2$ and the angularly bent end $f^6$ of the inner jaw $f^4$ passes through a vertical slot formed for it in the outer wall of the support on which the magazine stands. The bottom of this box is formed by some one of the series of stop bars. The race-way into which the matrix bars are discharged from the assembly box is bounded on the rear side by a vertical shield fixed to the outer edge of the bed plate of the machine, and on the outer side by a rail $g$ Figs. 32, 36 on which is the aligning bar. This aligning bar at the assembly end of the rail $g$, and from there to the justifier, is a horizontal rib $g'$, projecting from the top edge of the rail into the race-way and cast in one with the rail. Beyond the justifier, and for the remainder of the race-way, the aligning bar is a movable bar $g^2$ Figs. 32, 33, held to the rail by a pin and inclined slot connection $g^3$, $g^4$, so that it may be projected into and retracted from the race-way—of which more hereinafter. The race-way begins at the assembly box, and the end $g^5$ Figs. 30, 31 of the aligning bar or rib $g'$ at this point enters the assembly box, through a notch or clearance formed for that purpose in the angularly bent end $f^7$, of the outer jaw $f^5$. The object of this is that before the matrix bar can pass beyond the support of its stop bar (which for the moment and until the matrix bar is ejected from the box forms the bottom of the box) its proper aligning notch will have engaged the aligning bar, thus assuring its permanent alignment. We thus have an assembly box closed permanently on the sides and rear, and provided with a movable discharge end, and a bottom formed by some one of the stop bars. Into this box the matrix bar drops and is caused to engage the aligning bar before the support of its stop bar is withdrawn, and before it is discharged from the box. Another feature of the box of practical value and importance is the matrix-bar-detent or pawl $g^6$, (Figs. 14, 16,) which is pivoted in the side $f^2$ of the box, with its acting end projecting through into the box and there held by a light spring. The matrix bar, when delivered, shoots down into the assembly box with considerable force, and when it brings up suddenly against its stop bar, it is apt at times to rebound or get out of place. Any such liability is prevented by the pawl $g^6$. The matrix bar passes down by it with entire ease, but the moment the bar brings up against its stop, the pawl at that time will be opposite an aligning notch in the bar, and will engage that notch, thus preventing any upward movement or jump of the matrix bar.

To complete the description of the assembly box, it remains to describe the means for ejecting the matrix bar therefrom into the race-way beyond. The ejector and its operating mechanism can best be seen in Figs. 12 to 14 and 28. It comprises a reciprocatory ejecting finger $h$ which moves back and forth in the assembly box, entering it through an opening provided for that purpose in the wall $f$ of the box. The finger at its right hand end outside the box is attached to a slanting support $h'$ Fig. 12 which is adapted to pass between and spread apart cam swells or inclines $f^8$, $f^9$ formed upon the interior opposite faces of the jaws $f^4$, $f^5$, said swells or inclines projecting inwardly through openings formed in the stationary sides $f^2$, $f^3$, of the box. Thus when the ejector advances to thrust forward and discharge the matrix bar the jaws will be spread apart, opening the front end of the box, and allowing the matrix bar to pass out from it into the race way. The ejector is operated by the following means: The upright support $h'$ at the top is connected to a horizontal sliding plate $h^3$, held to the rear face of the back of the box by pins which enter guide slots formed longitudinally of the slide $h^3$, thus permitting the latter a limited movement of reciprocation. This movement is imparted to the slide $h^3$ by an elbow lever $h^4$, Fig. 13 pivoted at its elbow to the frame of the machine, and having one of its arms jointed to the slide $h^3$ and the other pinned to a rod $h^5$ which extends back to and is attached to the upright arm of the bell crank lever $e$. Thus when the latter is forced back, in the operation of delivering a matrix bar to the assembly box, the ejector thereby will be retracted, leaving the box free to be entered by the matrix bar. When, however, the lever $e$ returns to normal, the ejector thereby will be operated to at once thrust forward the matrix bar, and at the same time to open the front jaws of the box to permit it to pass out,—the bar as before said engaging the aligning bar before the box is opened or the stop bar is withdrawn. The matrix bar, engaging with its proper aligning notch the aligning bar $g'$ bordering the race-way, is thus discharged from the assembly box into the race-way, and it is pushed along far enough to pass beyond the spring hooks or detents $i$ Figs. 28, 32 which project laterally into the race-way from opposite sides thereof. These hooks or detents prevent the matrix bar from returning or moving backward after the ejector withdraws, and they further furnish a temporary abutment for the support of one end of the line which is built up by pushing the matrix bars in succession beyond them. At this point the space box and delivery mechanism, can conveniently be described. The description has been deferred until now for the reason that the spaces, although they are operated on by the ejector $h$, do not enter the assembly box. The arrangement of parts can best be understood by reference to Figs. 3, 4, 9, 17 to 23. The space chamber Z Fig. 28 is on the front of the magazine, and the delivery point is directly over the constricted space between the hooks $i$ and the angular ends $f^6$, $f^7$, of the jaws $f^4$, $f^5$. It is down through this narrow space that the delivered spacer falls, as indicated in Fig. 28, where one is shown hanging and partly delivered; and it brings up only when its lug $z^4$ Fig. 2, catches on the aligning bar $g'$, Fig. 32 which is the normal position of the spacer in the line of which it forms part. A spacer is delivered at each downward stroke of the vibratory arm $j$ Fig. 28 located on the front of the space box Z. Without describing at present the mechanism controlled for this purpose by the arm $j$ I pass to a description of the mechanism by which it is connected to and properly timed in its operations relatively to the ejector $h$. The arm $j$ is fixed on a shaft $j'$ Fig. 17 extending back beneath the magazine and having on its rear end a similar arm $j^2$, which by a connecting rod $j^3$, is connected to one arm of an angle lever $j^4$, pivoted to the frame of the machine at its elbow. The lower and vertical arm of the lever $j^4$, meets and is adapted to bear back against the upper extremity of the bell crank lever $e$, and is spring pulled in a suitable manner, so that unless prevented it will bear against and force back the arm of the angle lever $e$. It is thus prevented by a pivoted detent $j^5$, which engages a lug $j^6$ on the lever $j^4$. In order to release, when desired, the space bar lever $j^4$ from the control of the detent $j^5$, the free end of the latter is by a connecting rod $j^7$ jointed to one end of a vibrating lever $j^8$ pivoted at its center on a horizontal axis, and having its opposite end inserted in the slotted or forked end of a lever $j^9$, which is located beneath the bed plate of the machine, and is pivoted upon a horizontal axis $j^{10}$. The forward and shorter end of this lever by a cross piece is connected to the space key lever $j^{11}$, which is arranged at a convenient point alongside the key-board in proximity to the matrix keys and has its pivot at $j^{12}$; see Fig. 18. Whenever the space key is depressed the arm $j$ Fig. 28, through its connections will be swung down with the effect of delivering a spacer. At the same time with this, the movement of the released lever $j^4$ Fig. 17 has caused the rearward vibration of the bell crank lever $e$ which in turn has caused the retraction of the ejector $h$. But the rearward movement of the lever $e$ has brought its cam into contact with the constantly revolving roller below it, and therefore the lever is at once returned to normal, and in so moving operates the ejector to push forward the delivered spacer into the race-way beyond the hooks $i$, Fig. 28 and at the same time returns the lever $j^4$ Fig. 7, to position where its lug $j^6$ will be engaged by the detent $j^5$. The space lever of course is provided with the usual recoil spring, by which it is returned to its original position after its stroke.

It remains to describe the means operated or controlled by or from the arm $j$ to secure the delivery of the spacers. It is pinned at its free end to a vertical reciprocatory bar $i'$ Fig. 20 guided in its movements by a pin and vertical slot connection with the outer face of the space magazine chamber Z on which it is placed. To the top of the bar $i'$ is secured a plate $i^2$, which has a vertical piece $i^3$ Fig. 22, attached to and bent at right angles to it so as to enter the space magazine through a slot $i^4$, formed for it in the side of the magazine. It is adapted to play up and down just in advance of the front end of the wire $Z'$, Fig. 21, from which the spacers hang by their hooks, and, at the top, has a shape, the reverse of the hook end of the spacer, thus providing it with an upwardly projecting horn or finger $i^5$. The piece $i^3$, is adapted to play up and down in a narrow passage just wide enough to receive one spacer between the front end of the wire $Z'$ and the vertical plate $i^6$, secured to the interior of the box on the side next to the open space or clearance which exists between the overhanging spacer hook above and the body of the spacer below. The lateral projection of the plate $i^6$ is a little less than the clearance or opening in the spacer just referred to, so that if the spacer in the box on one side of the plate be lifted far enough to cause the plate to register with that clearance, it (the spacer) can pass beyond or to the other side of the plate, where there is a vertical passage $i^7$, through which the spacer passes down and is discharged. It is the function of the piece $i^3$ to thus lift the spacer. To this end the normal position of this piece $i^3$, which we may call the space-lifter, is with its horn $i^5$, elevated a little above the front end of the wire $Z'$ as seen in Fig. 19. In this position it acts as a stop to hold the spacers in place on the wire. Whenever it is depressed, however, its horn $i^5$ is lowered so as to come just below the level of the front end of the wire $Z'$. When this takes place, the front spacer will by gravity pass down from the wire onto the lifter, the horn $i^5$, entering the hook and sustaining the spacer, and the retaining plate $i^6$, preventing the hook from passing beyond the lifting horn. Then, when the lifter rises, it carries up with it the spacer until the clearance or opening on the hook side of the latter registers with the retaining plate, at which time the spacer will drop off from the lifter and passing beyond the retaining plate will enter the passage $i^7$. A shoe $i^8$ is placed above the wire $Z'$ with just enough distance between its front end and the retaining plate to permit the upward passage of one spacer only, thus preventing the lifter from delivering more than one spacer at a time. In order to prevent the lower end of those spacers which are still held on the wire $Z'$ from entering the passage $i^7$, and consequently interfering with the downward movement of the delivered spacer, I provide at the bottom of the magazine a retaining abutment $i^9$ Figs. 19, 21, against which the lower end of the front spacer on the wire Z' will catch. When this front spacer is raised by the lifter, its lower end will be elevated far enough to clear the abutment $i^9$, and consequently will swing out into the passage $i^7$ beyond. The spacer, when it is discharged into the delivery passage, does not at once pass down and out from the same. On the contrary its lug $z^4$ catches on a light spring pressed retaining pawl $i^{10}$, interposed in the passage. Thus on the first reciprocation of the lifter the spacer is discharged into the delivery passage and is there held by the pawl $i^{10}$. To release it from the control of this pawl, I provide a pusher $i^{11}$, Fig. 20 which is a plate secured to the reciprocating bar $i'$, and provided with an angular end $i^{12}$, Fig. 22, which enters the space magazine through a slot provided for that purpose, and is so positioned that when depressed it will bear upon the lug $z^4$ of any spacer that may be held by the retaining pawl $i^{10}$, and will shoot or forcibly propel the spacer past the pawl. Thus two movements of the space key are required for the discharge of any one spacer; consequently before setting the machine in operation the space key should be once struck, so as to deliver a spacer to the retaining pawl $i^{10}$; after that, each stroke of the key will deliver a spacer to the line in process of assembling in the race-way below.

Having now described the mechanism by which the matrix bars and spacers are delivered and discharged into the race-way in proper engagement with the aligning bar, I will proceed to describe the means by which the delivered matrix bars and spacers are held in place, during the composition of the line of which they form part.

I have already stated that the line is held at one end (the end next to the assembly box) by the spring hooks or detents $i$, Fig. 28. At the opposite end, it is held by an abutment movable lengthwise of the race-way and projecting therein to furnish a shoulder against which the front end of the line can bear. This abutment is spring drawn toward the hooks $i$, so that it will recede as more and more bars are forced past the hooks into the line. This abutment is best shown in Figs. 24 to 28, and its construction is as follows:—The abutment proper consists preferably of two fingers $k$, Fig. 4 which extend into the race-way through horizontal slots $k'$ in the plate which forms the rear face of the race-way. The fingers at their rear ends are fast to a sleeve $k^2$, (Sheet 9) journaled on an axle $k^3$, in a block $k^4$ mounted and adapted to slide back and forth in suitable guide-ways $k^5$ on the back of the plate which forms the rear side of the race-way. This block is spring pulled toward the hooks $i$ by spring $k^6$. The fingers $k$ are held in projected position by means of a spring-actuated hook pawl $k^7$, pivoted at $k^8$ to the block, and engaging a slotted detent arm $k^9$, attached to the sleeve $k^2$. Whenever the hook pawl is released from the detent $k^9$, the fingers can swing back to allow the line of matrix bars to pass them; they are thus released only after the line has been formed and has been taken into the control of the carriage, hereinafter described, by which said line is conveyed along the race-way to the various points where it is to be operated on. It is sufficient to say now, however, that at the extreme of the movement of the abutment, the tail of the hook pawl $k^7$ comes in contact with a stop $k^{10}$, by which the fingers automatically are released, so that they may fold back within the plate through which they project. The fingers however, by spring action (as for example by spring $k^{15}$) are caused to normally stand in projected position. They fold back only when force is applied, as for example when the line is moved past them by the carriage; and they return to position as soon as that force is removed. The block $k^4$, being spring drawn toward the hooks, must be provided with means by which ordinarily it is held against the stress of its spring, and to this end I provide it with a spring acting pawl $k^{11}$, which takes into a ratchet $k^{12}$ on the adjoining face of the supporting plate on which the block moves. Manifestly, however, at the time the fingers $k$ are unlocked, and out of use, the block $k^4$ should be capable of at once returning to normal position, so as to cause the fingers to take up anew their position adjoining the hooks $i$. To this end I mount on the block $k^4$ a pivoted hammerheaded lever $k^{13}$, one end of which overhangs the tail of the pawl $k^{11}$, and the other end is shaped, as shown more particularly in Fig. 25, to be acted on by a wiper or cam $k^{14}$, carried by the sleeve $k^2$, in such manner that when the fingers $k$ swing back out of the race-way, the cam $k^{14}$ will cause the lever $k^{13}$, to press down upon the tail of the pawl $k^{11}$, thus disengaging the latter from its ratchet and leaving the block $k^4$ free to be at once returned by its spring to normal position. The lever $k^{13}$ is pulled by a strong spring $k^{15}$ toward the cam $k^{14}$, and it thus serves, as hereinbefore indicated, to hold the fingers $k$ in projected position, and to return them to that position after they have been wiped back by a superior force.

*Line carriage.*—I proceed now to a description of the carriage by which the line, after it has been formed between the fingers $k$ and hooks $i$ Fig. 28 is taken and conveyed to the various mechanisms which are to successively act upon it. The carriage is best shown in Figs. 3, 4, 28, 28$^a$, 29, 32. The body or main part of the carriage is marked H. It comprises a casting or frame, the lower part of which is mounted to run on the guide rail H$^2$, Fig. 28, which passes through the base of the main part of the carriage, at which point rollers H$^\times$ Fig. 4 are provided in the carriage above and below the rail to reduce friction. The upper part of the main carriage portion is sleeved to run on a guide rod $H^3$, Fig. 28 which extends along the front of the machine, parallel with the aligning bar rail $g$. The rod $H^3$ and the lower rail $H^2$ are stationary and are suitably attached to the frame of the machine. The lower rail $H^2$ is longitudinally slotted from end to end for the passage of the line carriage lever $H^4$ Fig. 3, the outer end of which enters a slot in the main carriage H as shown in Figs. 3, 36. The remaining portion of the carriage frame is shown at $H'$ Fig. 28. It is sleeved at its upper end to encircle the guide rod $H^3$, and at its lower end is sleeved to encircle a shaft $H^5$, which extends through the sleeve of the part $H'$ into the main carriage H. This shaft is capable of slight rotary movement, independently of both portions of the carriage, and is capable of slight lengthwise movement, which is shared by the part $H'$ only. At the upper part of the main carriage H and encircling the guide rod $H^3$, is a hub $H^6$, carrying a radial wing or fin $H^7$ which when the carriage is in its rearward position, shown in Fig. 28, can, by the rotation of the hub, be swung up so as to bear against the rear end of the assembled line of matrix bars and spaces temporarily held at that point by the hooks $i$, the wing at this time occupying the position represented in Fig. 32. The hub $H^6$ is prolonged to the right as a sleeve which passes through the upper carriage sleeve and has on the end projecting to the right beyond the latter a radial arm $H^8$, which serves as a lever or handle by which the hub can be turned. In the position of parts shown in Fig. 28, the lever $H^8$ is out, and in the position it occupies when the wing $H^7$ is down out of the race-way and out of engagement with the line. By pushing the lever inward the wing $H^7$ will be caused to swing inwardly into the race-way (as in Fig. 32) and up alongside of and in contact with the rear of the assembled line. A spiral torsion spring $H^9$, encircling the guide rod $H^3$, and attached at one end to the movable carriage portion $H'$ and to the other end to the hub $H^6$ tends to throw the lever $H^8$ out, and consequently to throw the wing $H^7$ down. Therefore, to maintain the wing in upraised position against the stress of the spring, I employ a spring-controlled latch $l$, Fig. 28 pivoted on the face of the main carriage part H and arranged to engage a projection $l'$ on the lever $H^8$ when the latter is pressed in. This latch, as shown in Fig. 28ª, has on it a tail piece $l^2$ which, when the carriage moves outwardly or toward the mold, wipes against the spring-pressed vibratory pawl $l^3$, Figs. 28, 28ª, placed on the aligning rail in the path of the tail of the latch, the pawl at this time yielding to allow the latch to pass. When, however, the carriage, having finished its outward journey, returns to its starting point, the pawl $l^3$, will not yield, it being rigid in the direction from which pressure is now exerted on it by the latch; and at this time it acts as a rigid stop by which the latch is operated to release the lever $H^8$, consequently permitting the wing $H^7$ to swing down out of the race-way. It is of course necessary that the wing should so move at this time, because, in the practical use of the machine, the operator is assembling another line while the previously assembled line is being taken care of by the carriage; consequently by the time the carriage returns another line will have been partly or wholly assembled, and this line could not possibly be passed by the carriage without its rear wing $H^7$ being first swung down out of the path of the line. By the described arrangement of the latch and its operating pawl, this result is effected before the wing reaches the line. The end of the line opposite that where the wing comes is held by the lug $H^9$, Fig. 32 which is attached to the movable carriage part $H'$. This lug extends up into the race-way and is permanently located therein; and the formed line is held between the lug $H^9$ and the wing $H^7$. When the line is full, the fingers $k$ Fig. 4 should be forced out far enough to bring their inner edges against which the front end of the line rests flush with inner face of the lug $H^9$. For this purpose a recess or clearance $h^\times$ Fig. 32 is formed in the inner face of the lug $H^9$, for the reception at this time of the lower finger $k$, the dimensions of this recess being sufficient to permit the free backward swing of the unlocked finger. The shaft $H^5$ Fig. 32 on which the lower portion of the movable carriage part $H'$ is sleeved has fixed to it a hub $H^{10}$ carrying a crank $H^{11}$; by rotating this hub the shaft itself will be correspondingly rotated. That portion of the shaft which passes into or through the main carriage H has fixed to it a hub $H^{12}$ best seen in Fig. 29, having ratchet teeth at both ends, and this ratcheted hub is located between two sleeves $H^{13}$, $H^{14}$, stationary in the part H, and having their interior opposite ends ratcheted to correspond with the ratchet on the hub $H^{12}$. These sleeves are set at such distance apart that when the ratchet of the one sleeve is in full engagement with the hub, the ratchet of the other sleeve will be just out of engagement with the latter. Normally the hub engages the right hand ratchet sleeve as shown in Fig. 29. If now the crank $H^{11}$ be raised, this will rotate the shaft $H^5$ in a direction to cause its hub to move out of engagement with the right hand ratchet sleeve, and into engagement with the left hand one; but in so moving it has not only a movement of rotation, but also a longitudinal movement by reason of the slant of the ratchet teeth, which throw the shaft slightly to the left. The movement is shared by the movable carriage portion $H'$, the effect being to cause the lug $H^9$ Fig. 32 to slightly move to the left, so as to increase the distance between it and the wing $H^7$, the effect being to loosen the hold of the carriage on the line. The particular use made of this arrangement will be presently described. It will suffice at present to say that the crank H¹¹ is thus operated by a sliding lifter H¹⁵, Fig. 28 secured on the left hand edge of the main carriage part H. As soon as the lifter is released a torsion spring H¹⁶ secured at one end to the movable carriage part H' and at the other end to the crank arm H¹¹, returns the parts to normal position. The line carriage lever H⁴ Fig. 3 is operated from the main or line shaft at the rear of the machine. This lever, which is below the bed plate of the machine is pivoted at $h^5$, Figs. 35, 36 and is composed of two parts jointed together at $h^6$ the forward part or blade, which engages with its front end the line carriage, having its rear end, back of the pivot $h^6$, curved outwardly, and connected by a strong pull spring $h^7$ to the rear part of the lever. The main object of this is that if by any chance the line carriage during its outward travel should stick or halt, the lever still being actuated by its cam, the rear part of the lever can move, without moving the forward part, this being permitted by the spring connection $h^7$. The set of the two parts of the lever, that is to say the extent to which the spring $h^7$ can pull the curved rear end of the front part toward the rear part, is regulated by a lug $h^8$ on the rear part of the lever, having an adjustable screw in its head against which a shoulder $h^9$, on the front part of the lever brings up. The rear part of the lever H⁴ is connected by a link $h^{10}$ to the front end of a lever $h^{11}$, pivoted to the bed plate at its rear end and having on it a roller stud to engage its operating cam $l$ on the line shaft.

*Justifier.*—The carriage, with the assembled line which it holds, moves along the raceway first to the justifier (Figs. 4, 28, 36) where it dwells long enough to permit justification to be accomplished. At this point there is on the aligning rail a raised flange $z^7$, Fig. 28 which overhangs the lugs $z^4$ of the spacers contained in the line, the lugs thus being held in a groove or guide-way formed by the top of the aligning bar below, and the overhanging flange $z^7$ above. The lugs $z^4$ Fig. 2, are on the upper sections of the spacers, and consequently these sections are held rigid against movement, while their lower expander sections are pushed up into them by the justifier. The justifier consists of a horizontal shoe I Fig. 28 fixed to a base I' movable vertically in guide-ways in the frame of the machine. This vertically sliding base is connected by a link I², to a lever I³ Fig. 36 pivoted on a horizontal axis beneath the bed-plate and connected at its rear end by a spring link to the lever I⁵, hung at its rear end in suitable bearings on the bed plate and engaging by a laterally projecting roller stud its operating cam 2 on the line shaft. The cam has two corrugations in it, as seen in Fig. 36, by which two successive vertical reciprocating movements are given to the justifying shoe, the first movement being about two-thirds of the full motion, and the second being the entire throw which is necessary at any time in the operation of the machine. The barrel I⁴ has at its lower end a swiveled link I⁶, which is connected at its lower end with the lever I³, and passes loosely through the bottom of the barrel; upon the head of this link within the barrel rests the lower end of a spiral spring I⁷, which is held down by a nut I⁸, screwed into the head of the barrel; and an eye bolt I⁹ screwed into the nut joins that nut to the lever I⁵. As the threads upon the eye bolt and upon the exterior of the nut are the same in pitch, the nut can be screwed down more or less as desired upon the spring to regulate the extent of its initial compression. By this spring connection any over movement of the lever I⁵ is taken up by the spring which is compressed between the head of the link I⁶ below and the nut I⁸ above without imparting further upward movement to the justifying shoe. The shoe in moving upward forces up the lower sections of the spacers so as to expand uniformly the upper sections, thus filling out and justifying the line. Two successive upward movements are given to the shoe for the reason that at times the first movement does not suffice to force the spacers up far enough to justify. The second upward movement however, rectifies whatever might have been lacking, and effects perfect justification. The line carriage dwells long enough in front of the justifier to permit the foregoing movements of the justifier, and it then by its lever is moved onward in the race-way to the casting point where it rests. At this point it brings up against the end of the race-way which here terminates, and during the casting operation it is held firmly up against that solid end of the race-way by the line carriage lever H⁴ Fig. 4. For this purpose a slight over motion is imparted to the lever by the cam 1, this over motion being compensated for by the spring connection $h^7$, between the two parts of the lever, which serves, as well, to hold the front part or section of the lever most firmly up to its work. After passing the justifier the line passes from the fixed aligning rib $g'$ Fig. 32 on the aligning rail onto the movable aligning bar $g^2$, which at this time projects into the race-way and forms an accurate prolongation of the aligning rib. This movable aligning bar extends quite the remainder of the length of the raceway, entering a horizontal slot formed for it, and the rail, in the anvil (or vise as it is usually termed) V Figs. 33, 47.

*Line casting mechanism.*—At this point, at the end of the forward movement of the line carriage, the line is brought opposite to the mold J, and is there held by a suitable delay surface on the line carriage cam 1 until after the casting operation. The mold and its appurtenances are best shown in Figs. 3, 4, 33, 34, 37, 38, 42. The mold itself is an oblong block of metal of a thickness which is type high and provided with a transverse horizontal slot of dimensions to accord with the thickness and width of the line-slug or bar to be cast therein. This mold is held and slides in dovetail ways formed in opposite edges of the longitudinal slot in the slotted guide bar J', Fig. 34 in which the mold is supported and can slide lengthwise of the machine. The mold, as shown in Figs. 34, 38, has a taper nozzle, which projects through a corresponding opening in the stationary shield or plate $J^{23}$ which bounds the rear side of the race-way, and it is thus brought into position where its front end or nozzle can be closed by the line of matrices from which the impression is to be taken. To the rear of the mold and mounted on the bed-plate of the machine is the melting pot K, Fig. 38, of any suitable construction, which is arranged to slide back and forth, so as to carry its discharge nozzle to and away from the mold. The pot has the usual appliances for heating and is provided with a force pump K', by which when the parts are in proper position the molten metal is ejected through the nozzle of the pot into the mold. The movements of the pot to and from the mold are effected by a flange cam 3 on the line shaft properly shaped to thus move the pot at the proper times. The cam 3 Figs. 3, 38, is connected to the pot by anti-friction rollers on the ends of arms $m$ which engage the inner surface of the cam for the purpose of giving a rearward movement to the pot, and by a roller $m'$, which bears upon the outer surface of the cam. The arms $m$ are fast to and extend rearward from the pot, or rather from the jacket which incases the pot proper. The roller $m'$ is mounted on a shaft $m^3$ which is journaled in a sliding cross head $m^2$, supported between the arms $m$. This shaft $m^3$, passes through elongated slots in the arms $m$, so that it and the cross head in which it is journaled may have movement transversely of the machine independently of the arms; and the outer ends of the shaft are received in pins $m^4$, which pins enter barrels $m^5$, fast to the arms $m$, or some other part of the pot. These barrels contain spiral springs $m^6$, which surround the pins and press against the heads of the latter, the tendency of the springs being to force the shaft and cross head to the rear. A bolt $m^7$, fast to the pot and passing through the cross-head into a slot $m^8$ therein, where a nut is screwed on the projecting end of the bolt, serves to limit the extent of independent movement of the cross-head. By this means I am enabled to give a slight over motion to cam 3, so that in moving forward the nozzle of the pot will at all times be pressed most firmly against the mold, the cross-head, through its springs $m^4$, yielding and compensating for any over motion of the cam. Thus when the pot moves up to the mold (which movement takes place after the line of matrices has been brought opposite to the other end of the mold) its forward thrust or pressure upon the mold tends to force all the parts closely together and to tightly clamp the line between the nozzle of the mold and the anvil V—which latter, as it receives and sustains the thrust, is made a heavy solid piece of metal rigidly fixed to the frame of the machine. When the parts are thus clamped together, the pump K' acts to inject the metal into the mold, and then the pot by its cam is retracted—the casting operation having been completed. The pump is operated by connecting its piston rod to a lever $K^2$, pivoted at its rear to the frame near the cam 4 by which it is operated. The lever overhangs the cam and is provided with a roller which runs on it; it also has a pull spring $K^3$, which is under tension when the roller is running on the circular portion of the cam. As soon, however, as the jog or depression in the cam comes under the roller the lever being now free to drop is pulled down quickly by its spring, thus giving the quick down stroke to the pump piston needed to properly eject the metal from the pot into the mold. We have thus reached that stage in the cycle of operations of the machine at which the slug has been cast. The pot as above stated then moves back; and the mold withdraws and strips itself from the line and with its contained slug passes along toward the left hand end of the machine where it meets the mechanism for trimming the slug and for ejecting it from the mold onto the galley. These mechanisms and their mode of operation will be presently described. But it will be better at this time to confine attention to the subsequent operations which are performed on the line of matrix and space bars.

*Matrix and space bar depressing mechanism.*—After the casting has been effected, all that remains is to remove the line and to return the matrix and space bars of which it is composed each to its own appropriate magazine chamber. In order to effect this result, the matrix bars of the line must however be first brought with their heels all in one plane, so that their hooks will stand at normal height with relation to one another. So too, the lower sections of the spacers must be shoved down, in order to bring the spacers themselves to their normal condition in which they can be returned to their magazine, ready again for use without further manipulation or preparation. For this purpose, I provide at the casting point a depressor, which shoves down on the matrix bars and spacers so as to bring the heels of the matrix bars all on the same level, and to also extend the spacers their full normal length. The line however is still tightly clamped in its carriage, and the aligning notches of the matrix bars still engage the aligning bar. Manifestly, therefore, the hold of the carriage on the line must be relaxed and the matrix bars must be disengaged from the aligning bar before the depressor can act. I therefore combine, with the depressor, mechanism whereby before the depressor acts upon the line, the two parts H and H' of the carriage are spread slightly apart and the aligning bar $g^2$ is retracted to disengage it from the matrix bars. This is the purpose for which the two parts of the carriage are made longitudinally movable with relation to each other, and a movable aligning bar $g^2$ is provided, as hereinbefore described. I proceed now to a description of the mechanism by which these three operations are accomplished, referring more particularly to Figs. 33, 34, 43 to 46. All of these mechanisms are actuated from an auxiliary shaft L Fig. 33, supported in bearings under the bed plate, near its front flange, the shaft being horizontal and extending lengthwise of the machine. From a cam 5 Fig. 3, on the line shaft the auxiliary shaft is rocked first in one direction and then, after a proper interval, in the opposite direction. It derives its movement therefrom by a crank arm L', Fig. 44, on it which by a connecting rod $L^2$ is joined to a lever $L^3$, Fig. 45$^a$, carrying a roller which engages the cam. The carriage spreading devices have already been described in connection with the carriage, the spreading being accomplished by pushing up the lifting slide $H^{15}$ Fig. 28, to raise the crank $H^{11}$. This action upon the slide is effected by a transverse sliding bar $m^7$ Fig. 44, supported in proper bearings and extending through the front flange of the bed plate at a level to cross the carriage just below the pin $y$ on the lifting slide $H^{15}$. The transverse sliding bar $m^7$ has on it a wedge or incline $m^8$, the base of which just meets the pin $y$. This is the position of the parts when the carriage is at the casting point, the slide bar $m^7$ having been projected before the carriage reaches that point. The bar $m^7$ is moved to and fro from shaft L by the crank arm $m^9$ which is loosely pinned to the bar. When the bar is retracted its incline $m^8$ will, by its action on the pin $y$, raise the slide $H^{15}$ and thus spread apart the two parts H', H, of the carriage. The aligning-bar retracting mechanism consists of a crank $n$, Figs. 45, 46, on the auxiliary shaft, which by a connecting rod $n'$ passing out through the front of the machine frame, is joined to a crank $n^2$ on the lower end of a shaft $n^3$, which passes up through a vertical hole drilled in the anvil V, and has at its top a head $n^4$, on which is an eccentric pin $n^5$ that engages a slot in the aligning bar $g^2$. The aligning rail at this point is recessed or cut away to allow the head of the shaft to pass it. The shaft is upheld in place by a bushing $n^6$ fixed in the opening in the anvil below the head of the shaft. Rearward movement of the crank $n$ will revolve the shaft $n^3$ in a direction to cause its eccentric pin to pull back and retract the movable aligning bar far enough to remove it from the aligning notches of the matrix bars. The line depressing mechanism comprises a depressor $o$, Fig. 34 composed of a rectangular skeleton sliding frame, the side bars of which move in vertical guideways formed in the plate or shield which bounds the rear of the race-way, and placed on each side of the mold opening therein; the side bars are contained in the guideways so as to be flush with the face of the plate or shield. The top cross bar of the depressor projects a little beyond the face of the plate, so as to overhang the race-way just enough to allow it, in its descent, to clear the hooks of the matrix and space bars, and yet strike and bear upon the top edge of their body parts. This depressor has its lower end connected by a link $o'$, Fig. 43, with the curved end of a pivoted lever $o^2$, the rear end of which is connected to a crank $o^3$ on the auxiliary shaft by a link $o^4$ pinned to the crank, and having a longitudinal slot of some length at its other end which is entered by a pin on the rear end of the lever $o^2$. This slot and pin connection is essential inasmuch as it permits a certain amount of lost motion to the crank $o^3$, before it begins to actually move the depressor; and during this interval, the other quick responding mechanism will have acted to spread the carriage and draw back the aligning bar sufficiently to warrant the descent of the depressor. As the auxiliary shaft receives from its actuating cam a movement of sixty degrees in each direction, there is ample opportunity to obtain this sequence of movements. Thus the movement of the auxiliary shaft in one direction opens the carriage, draws back the aligning bar and pulls down the depressor, and the latter in its descent thrusts down the bodies of the matrix bars so that they shall all be on the same level, and also pushes down the projecting tops of the lower expander sections of the spacers (previously pushed up by the justifier) so as to extend the spacers to their normal length. I remark here that the lugs $z^4$ Fig. 49, of the spacers extend farther outwardly than the outer edges of the matrix bars, so that they will not only overlap the edge portion of the projecting aligning bar $g^2$, but also will extend outwardly to overhang the inner edge of the rail $g$. To accommodate the lugs, therefore, the anvil V on its inner face has (as seen in Figs. 47 to 49) a horizontal groove $v$ cut in it, the bottom of this groove being formed by a thin metallic strip $g^6$ which is secured to the anvil just above the aligning bar. This strip (which is a stationary one) extends back over the top of the movable aligning bar and terminates at a point near where the distributer is located, as indicated in Figs. 3, 28, 32. The lugs $z^4$ (Sheet 16) of the spacers pass over on top of the inner edge of this strip, and are there held by it at the time the aligning bar is withdrawn, as seen in Fig. 49. Consequently the upper sections of the spacers are sustained firmly in place at the time the depressor pushes down their lower sections. The strip $g^6$ of course is never engaged by the matrix bars, inasmuch as it does not project beyond the inner edge of the aligning bar rail $g$. Below the point where the line is pushed down by the depressor is a fixed shoe $r$ Fig. 33, arranged a proper distance below the aligning rail. On the inner face of this shoe are formed two horizontal steps $r'$ and $r^2$ Fig. 32. The upper step $r'$ receives the heels of the depressed matrix bars, and the lower step $r^2$ receives the heels of the lower sections of the extended spacers. In this way these bars at their bottoms are all brought to one level for the matrix bars and another level for the spacers, the result being to leave the hooks on their upper ends at the relatively different heights at which they should stand. This shoe $r$, it may be remarked, extends along the machine from the casting point to the point where the line engages the distributer to be presently described, the object of this being to furnish a support for the matrix bars (which are at this time loosely held by the carriage) until after they have strung themselves upon the distributer wires; see Fig. 4. The line having been depressed, the carriage by its actuating cam and lever is started on its return movement. In so moving, the pin $y$ Fig. 44, on the carriage slide $H^{15}$ snaps past the wedge bar $m^7$, and thereupon the two parts of the carriage move toward each other, but inasmuch as the spacers have been extended and consequently reduced in thickness, the line still remains loose. The aligning bar however remains retracted until after the bars have been taken by the distributer from the race-way, the actuating cam of the auxiliary shaft being properly timed and proportioned to secure this result.

*Distributer.*—The distributer, which is met by the line of matrix bars and spacers as they are carried back through the race-way by the line carriage, is shown in Figs. 3, 4, 5, 39 to 41. The distributer may be described as consisting in a general way of carrier rods or wires M, Fig. 4, which by suitable mechanism are first lowered to stand one over the other in a vertical plane, overhanging the race-way in a position to permit the matrix bars which pertain to them severally to string themselves upon them by their hooks, and are then elevated and separated so as to stand in an approximately horizontal plane to register with the several guide wires in the magazine compartments or chambers, so that, by a proper pushing appliance, the bars strung upon or suspended from the distributer wires can be shoved forward off from the latter and on to the magazine wires which register with them, thus returning all the bars, whether spacers or matrices, to their appropriate chambers in the magazine. The preferred appliances which I use for this purpose are as follows: There are as many separate distributer wires M as there are compartments in the magazine—in this instance nine, eight for the eight different species of matrix bars and one for the spacers. Each distributer wire extends horizontally lengthwise of and parallel with the race-way, and each wire is supported and carried by two levers $M'$, $M^2$, Fig. 3, one near each end of the wire. The wire is secured to the outer end of each lever which is so shaped that the hook of the matrix or space bar can slide freely on the wire from one end of it to the other. The end of the wire which enters into the advancing hook is beveled to a point so that the hook will not catch against it. The two levers are secured upon a horizontal shaft $M^3$, Fig. 41, which has its bearings in standards $M^4$ and $M^5$, Fig. 3, erected on the bed plate. The series of shafts $M^3$, nine in all, are placed one above the other, their axes being arranged with relation to each other substantially as indicated in Fig. 41, so as to give them the proper throw, the arrangement being such that when the levers are down the distributer wires will overhang the race-way and stand in a vertical plane the one over the other, as indicated by the dotted lines in the figure last referred to. On the other hand when the levers are up, the wires stand in an approximately horizontal plane in which position they register with and form in effect a prolongation of the bar supporting wires of the several magazine chambers to which they pertain. The plane at this time, however, as seen in the drawings, is not absolutely horizontal, each wire being just a little below the level of the wire next in front. This arrangement is necessary in order that when the wires start simultaneously to descend—as they do—the rear one may just clear and pass under the one next in front. In order to actuate the distributer, I provide the levers on one side—in this instance the levers $M'$—with extensions or arms back of their pivots, which arms are pinned or pivoted to blocks $M^6$ each of which is held and can slide back and forth in its own horizontal guide groove in a vertical slide bar $M^7$ supported in a vertical guide-way in a rearward extension of the standard $M^5$. The slots, slide blocks, lever arms and centers or pivots are so proportioned and adjusted to the movement of the vertical slide bar $M^7$ as to give just the proper motion and throw to each distributer wire. The slide bar is actuated by a spring barrel link $M^8$, pinned at one end to the bar and at the other end to the front end of a lever $M^9$ pivoted at its rear in bearings on the bed plate and having a roller stud to engage an actuating cam 6 on the line shaft, this cam being so proportioned as to lower the distributer before the carriage on its return movement reaches the latter, to retain the distributer in that position while the matrix bars and spacers contained in the carriage are stringing themselves by their hooks on the wires, and then to raise the distributer, with the bars hanging from the wires, into position to register with the magazine wires. The spring barrel link $M^8$ is to compensate for any over motion of the actuating cam, and at the same time to hold the distributer wires firmly in place in their down positions. Thus, as the carriage on its return movement reaches and travels on the portion of the race-way where the distributer is located, the distributer wires will be down, the matrix bars and spacers will consequently string themselves on their appropriate wires, and the distributer will then be elevated, carrying with it the matrix bars and spacers dangling from the wires, the spacers and matrix bars being each upon its own separate and appropriate wire; and the carriage, continuing its course, returns to the point from which it originally started, the latch $l$, Fig. 28, as the carriage travels back past the distributer, being tripped by the trip pawl $l^3$, so as to allow the rear wing $H^7$ to be retracted and withdrawn from the race-way. The matrix bars and spacers having thus been separated into appropriate groups and raised into register with the supporting wires of their several magazine compartments, all that remains is to push them forward onto the last named wires, and then the work of distribution will be complete. This result I accomplish by the pushing mechanism, best shown in Figs. 39, 40. The pusher proper is a plate N extending below and transversely of the distributer wires and shaped along its upper edge to properly fit around the several distributer wires when the latter are in elevated positions; so that when it travels lengthwise of the wires it may carry along with it the several bars hanging from the distributer wires and wipe them off onto the magazine wires. This pusher plate is carried by two horizontal guide rods $N'$ supported and capable of sliding back and forth in bearing tubes or sleeves $N^2$, fixed on top of a standard or casting $N^3$, attached to the bed plate. Pinned to a suitable bearing, attached to the plate N is a link $N^4$, which at the other end is pinned to an arm $N^5$ extending from a horizontal shaft $N^6$, which extends back under and transversely of the bed plate and has fixed on its rear end a crank arm $N^7$, which by a roller stud engages the actuating cam 7. The actuating cam and connections of the pusher are so proportioned and timed in their movements that before the distributer wires descend the pusher will be retracted to the left of the wires so as to clear them, as seen in Fig. 39, where it will remain until after the distributer wires have been raised into register with the magazine wires, at which time it will advance and traverse the wires throughout their length, carrying before it such bars as may be hanging from the wires and pushing them off from the latter onto the magazine wires. This completes the description of those mechanisms by which the matrix bars and spacers from the time they leave the magazine and while they are traveling to and from the casting point are automatically taken care of and finally returned to the several magazine chambers from which they originally were taken.

*Slug trimming and ejecting devices.*—It remains only to describe first the devices for trimming the cast bar or slug, and ejecting it from the mold onto the galley, and secondly the system of gearing and connected appliances by which movement from the prime mover to the line shaft and to the friction roller which operates in connection with the cam on the bell crank lever $e$ is imparted and controlled. These will be described in the order named. The devices for trimming and ejecting the mold are best seen in Figs. 3, 4, 33, 34, 37, 42. The slotted guide bar $J'$ Fig. 34, in which the mold J moves, is pivoted on a vertical axis $J^{22}$ at its extreme left end, so that it may vibrate away from and against the back of the shield or plate $J^{23}$. The purpose of this is to permit the bar to recede far enough to draw back the nozzle of the mold, so as to strip it from the line, as well as to remove it from the opening in the front shield or plate into which it extends in order to meet the line. To effect this movement of the guide bar, which need be but slight, I connect it at or near its free end by a link $J^2$ (Fig. 37) to a crank arm on a horizontal shaft $J^3$ supported beneath the bed plate, parallel with the front of the machine. On the other end of this shaft is a shorter crank arm, which by a connecting rod $J^\times$ is joined to one arm of an angle lever $J^4$, the other arm of which lever has a roller stud to engage the actuating cam 8. In this way a slight movement to and from the front of the machine is imparted to the guide bar at proper intervals. The mold obtains its movement in and lengthwise of the guide bar from a finger $J^5$ (Figs. 31 and 42) which extends between two jaws or lugs on the rear of the mold so as to permit the lugs to move back and forth on the finger when the guide bar has moved on its pivot. The finger extends down through a longitudinal slot in the bed plate of a length sufficient to permit the travel of the finger and is fast to a slide $J^6$ dovetailed into the front of the machine below the bed plate, so as to be capable of longitudinal movement. A link $J^7$ connects this slide to one end of a pivoted lever $J^8$ the other end of which is toothed as a sector to engage a corresponding toothed sector on another lever $J^9$, pivoted between its ends, and having on its rear end a roller stud to engage the actuating cam 9. Upon the bed of the machine just to the left of the mold is mounted the knife $N^x$, Fig. 31 which shaves off the surplus type metal from that side of the mold. Beyond this knife is the trimming die O and the ejector P, by which the slug is forced from the mold into and through the trimming die, and onto the galley R, Fig. 42. The ejector is a thin blade of a size to pass through the interior of the mold, and it is attached to a plate which is dovetailed in guideways in which it can slide back and forth to and from the die O. It is thus actuated to move by an arm $P'$, pinned to it and having a forked or yoke shaped rear end which straddles the line shaft, and has its upper prong acted on by a stud $s$ and its lower prong which has a hook form at its extreme end by a stud $s'$, both on the cam disk 10; on which disk there is also, close to the center, a cam protuberance $s^2$, which at the beginning of the forward movement will bear against the central or axial part of the arm $P'$, and thrust it forward with great power. The stud $s$ advances the ejector; the stud $s'$ (engaging the hook end of the fork) retracts it: and the two studs are so located that the instant the first stud has fully advanced the ejector, the second stud will retract the ejector to normal position. The cam $s^2$ acts to start the casting or slug from the mold, forcing it loose and probably pushing it forward about an eighth of an inch; then the advancing action is taken up and completed by the stud $s$. These parts are timed to move as follows:—The guide bar $J'$, (immediately after the casting operation) is slightly retracted, so as to strip the mold from the line. The mold then moves along in the guide bar to the left, passing the knife $N^x$ by which surplus metal is trimmed off from the contiguous end of the mold, friction rollers $N^y$ being provided at this point in the machine to support the opposite side of the mold, and to hold it up to the knife during this operation. The mold then moves up to the trimming die O and stops; the guide bar $J'$ moves outward so as to bring the nozzle of the mold up close to the die; and the ejector then advancing thrusts the slug from the mold through the die on to the galley R, and then at once recedes to its normal position. And the mold then returns to place in front of the pot, in time for the next succeeding line.

In order to impart to the galley R Fig. 42, the step by step descending movement requisite to enable it to receive successive slugs or line bars discharged upon it from the die, it is provided with a vertical toothed rack bar which is engaged by a pivoted verge $R'$, the upper tooth of which is jointed and forwardly or downwardly spring pressed, so that after the full galley has descended and been emptied, it may be lifted again to its uppermost position, the jointed spring pressed tooth of the verge at this time yielding to permit the upward passage of the rack bar. The verge is operated by means of a pivoted vibratory arm $R^2$ which intermittently presses on the tail of the verge, so as to impart the escapement movement needed to allow its galley to descend one step at a time by gravity—this arm by connecting rod $R^3$ being connected to one end of a lever $R^4$, pivoted at the rear of the bed plate and having its other end in the path of a projection $s^4$ on the cam disk 10. After any one slug has been received by the galley this projection $s^4$ at once acts on the lever $R^4$ to move it momentarily in a direction to cause the galley to descend one step. The teeth of the rack bar with which the galley is provided are of course at a distance apart, corresponding with the thickness of the slug, or cast bar received by the galley.

*Stopping and starting mechanism.*—It remains to describe the devices for the transmission and control of motion to the line shaft, and to the friction roller $e^5$, Fig. 10, by which the cam of the lever $e$ is actuated. These devices are shown in detail in Figs. 3, 5, 50 to 54 inclusive. The main driving wheel S Fig. 3 takes its power from any convenient source. Attached to and revolving with it is a pinion $S'$ Fig. 50, meshing with an intermediate $S^2$ which serves to reduce the speed to the proper extent. This intermediate gears with a pinion $S^3$ loose on the shaft of the friction roller $e^5$. This shaft has on it a handle $t$, which, while rotating with the shaft, can slide on it back and forth to a limited extent. The handle is compelled to rotate with the shaft by means of a pin or dog $t'$ Fig. 52 which passes through a hole in a collar $t^2$ fast on the shaft. The face of the pinion $S^3$ adjoining the collar has in it a series of holes any one of which can be entered by the dog $t'$ when the handle $t$ is shoved in. In this way the friction-roller shaft can be clutched to or unclutched from the continuously revolving pinion $S^3$, and by this means the friction roller can be stopped and started at will. The intermediate gear $S^2$ (which continuously revolves) is fast to a tubular shaft $t^3$ Fig. 53, supported in proper bearings, which shaft is of course also in continuous rotation. Mounted loosely upon this continuously rotating tubular shaft is a pinion $S^4$, which has a hub that enters the annular hub of the intermediate $S^2$, and has formed on its inner end a series of teeth $t^4$ which form one member of a clutch. The other member of this clutch is formed by a toothed collar $t^5$, also loosely encircling the shaft $t^3$, and received within the annular hub of the intermediate $S^2$ which thus forms a housing for the clutch—the teeth of this collar facing and being fitted to engage the teeth $t^4$. The collar $t^5$ (which is the movable member of the clutch) is made fast to a clutch shaft $t^6$ within the tubular shaft by means of pins extending through longitudinal slots in the outer tubular shaft—the inner or clutch shaft thus being compelled to revolve with the outer shaft but at the same time being made capable of independent lengthwise movement in the latter, for the purpose of moving the toothed collar $t^5$ into and out of clutch with the other clutch member $t^4$. By a spring $t^7$, placed within the tubular shaft and pressing against the head or outer end of the clutch shaft, the two parts of the clutch are normally held in engagement thus compelling the pinion $S^4$ to revolve with the intermediate $S^2$. From pinion $S^4$ movement is imparted to the line shaft by the system of gears $S^5$, $S^6$, $S^7$, Fig. 51, the latter gear wheel being mounted on the line shaft on which are fixed all the operating cams hereinbefore described. In order to stop and start the line shaft, the clutch shaft $t^6$ has on its projecting inner end, a grooved hub, into which take the prongs of the fork of a shipping lever T, pivoted at $t^8$ on a vertical axis, and provided with a downwardly projecting pin $t^9$, which extends into the path of the wedge or beveled end of a slide bar $T'$. When this bar is pushed back, its beveled end will bear laterally against the pin $t^9$ on the shipping lever $T$ and will force the latter over in a direction to press the clutch shaft outward against the stress of its spring $t^7$, thus unclutching the parts and stopping the transmission of movement to the line shaft. The moment the slide bar is withdrawn, the shipping lever is released, and the spring $t^7$ at once throws the parts again into clutch. The slide bar $T'$ Fig. 51 by a connecting rod $T^2$ is joined to an operating lever handle $T^3$ (see also Fig. 4) at the front and on the extreme right of the machine; and by the movement of the handle the stopping and starting of the line shaft can be controlled. The handle is fixed on a shaft $T^4$ which extends across under the key-board, at the left hand end of which it is provided with an arm $T^5$ Fig. 28, placed opposite to the line locking lever or arm $H^8$ on the line carriage, by which the movable wing $H^7$ is swung up into place. The arrangement is such that when the operating handle is moved rearwardly (which is the movement for unclutching) the line locking lever will be operated to close the wing up against the line in the race-way. It is desirable that after one cycle of movement has been made—that is to say after the line carriage has moved from the assembly to the casting point, and thence back again to the assembling point—the movement of the line shaft should be automatically stopped. I make provision for this as follows: In a longitudinal slot in a box or offset projecting from that side of the shipping lever $T$ Figs. 50, 54 next to the gear wheel $S^7$, is a plate $x$ which can slide back and forth in this slot. The plate is, by a spring, pressed rearwardly so that its rear end will project beyond the rear of the offset in which it is mounted. In this position the end of the plate is in the path of a wiper $x'$ on the gear wheel $S^7$ which wiper, when it reaches the projecting rear portion of the plate $x$ will wipe laterally against it and thus will force the shipping lever over in a direction to unclutch—at which time the motion of the gear wheel $S^7$ consequently ceases, its wiper therefore still remaining in contact with the slide plate $x$, and thus holding the shipper lever in unclutching position. The plate consequently must be withdrawn from the wiper before the shipping lever can move in the opposite or clutching direction. To this end, I pivot on the lower part of the shipping lever a vertical toggle finger $x^2$ one end of which engages the slide and the other end of which engages the slide bar $T$. Rearward movement of the slide bar will cause the toggle finger to pull the slide plate $x$ forward against the stress of its spring, thus removing it from the wiper $x'$. The engagement of the toggle finger with the slide bar is made by means of a slot in the slide bar which the finger enters; and the bevel or incline on the end of the slide bar is so proportioned that when the slide bar moves outwardly it will permit the shipping lever to move to clutching position and then to start the line shaft in motion before the toggle arm permits the slide plate $x$ by its spring to be forced back its full distance, and in this way by the time the slide plate gets back to normal position, the wiper $x'$, by the starting of the gear wheel $S^7$, will have passed beyond it. The wiper is so positioned that it stops the line shaft at the instant the carriage has fully returned to the assembly point. Thus, in order to start the machine after it has stopped automatically, the operating handle is moved, first in and then out. By its inward movement the line-locking lever $H^7$ is operated to close the carriage upon the line, and the slide plate $x$ is drawn forward out of the path of the wiper $x'$. By its outward movement the shipping lever is permitted to move in clutching direction, which it at once does, with the effect of starting the line shaft, and the slide plate $x$ is also permitted to return to its original position, which it does, but not until the wiper on the now revolving gear wheel $S^7$ has moved far enough to clear it. The moment the gear wheel $S^7$ completes a full revolution, the machine is again automatically stopped by the action of the slide plate $x$ and wiper $x'$. But at any time during the movement the machine can be manually stopped and started by means of the main operating handle $T^3$.

*Conclusion.*—The manner in which the machine as a whole operates has been so fully indicated and set out in connection with the detailed description already given of the several mechanisms, which go to make up the machine, that nothing further on that point is deemed necessary.

In conclusion I remark, that the devices for casting, trimming and ejecting the slug, although they may contain novel features of mechanical detail, yet are essentially old devices which have been before used for type casting and like purposes. The casting of type in a mold by means of metal injected into the mold from one end against removable and interchangeable matrices closing the other end of the mold has long been known, and the bar thus cast has by suitable means been trimmed and removed from the mold. The material features of my invention, aside from the matrix bars themselves, are to be found in the means for storing, delivering and assembling the matrices, conveying the line to the casting point, and then distributing the individual members of that line, and returning them to their appropriate storage or magazine chambers. These means are particularly adapted to the needs of a system in which is employed a series of matrices of the kind hereinbefore described, these matrices being disconnected from the machine, and each one of them bearing several different characters, independently usable and less in number than the whole assortment of characters used in the machine; but some of these means, and some portions of the mechanisms used to operate on and control said matrix bars or matrices, are susceptible of use in other connections. The scheme of distributing the line I believe to be quite new with me, and also the provision by which any one of the disconnected bars, when it is delivered, is arrested at the point where the selected character upon it is in position to enter the line that is being composed. The same is true also of the delivery and assembling mechanisms. As to the justifier which I employ, it probably possesses novel mechanical details, but as these can be varied considerably by the skilled mechanic I lay no particular stress on them. The general scheme of justification embodied in it which contemplates the introduction of compound spaces at proper points into the line while it is being set up, and then the subsequent advancement or forcing forward of these spaces simultaneously and together so as to symmetrically and uniformly expand and justify the line, is, as I am aware not new, it being disclosed in Gally's expired United States Patent No. 129,331, of July 16, 1872.

I do not here broadly claim the combination in a line casting machine of a series of matrices each bearing several distinct characters, and mechanism for selecting and conducting the matrices to a place of assemblage or alignment, and adjusting the matrices endwise individually in order to bring their selected characters, one on each matrix, into a common line. The stop mechanism for this purpose is claimed herein only in connection with special devices—such as a peculiarly constructed magazine, a detent for preventing the rebound of the arrested matrix bar, and a slide bar E² of the construction hereinbefore indicated—which do not necessarily enter into the broad combination above stated. Nor do I here claim the combination in a line casting machine having suitable operating mechanism, of a series of matrices constructed to be assembled side by side in different orders to form the impression line, each matrix having several different characters less in number than the assortment used in the machine, the characters being independently usable. These and other features which more particularly concern the matrices themselves form the subject of my prior application for Letters Patent filed in the United States Patent Office September 14, 1892, bearing Serial No. 445,900.

Finally, I desire it to be understood that I do not restrict myself to the mechanical details hereinbefore described in illustration of my invention. Manifestly these can be very widely varied in many particulars by the skilled mechanic without material change in result and without essential departure from the spirit of the invention; but What I here claim as new and of my own invention, and desire to secure by Letters Patent, is as follows:

1. In a line casting machine, a series of matrix bars having body pieces of the same length and width and each provided with a selecting device forming part of and moving with the bar, and differing in size for each species of the matrix bar, the selecting devices of the matrix bars being adapted to be arranged in the same vertical plane when said bars are assembled to form a line, and means for engaging the selecting devices of a line of matrix bars and elevating and separating the different species simultaneously.

2. In a line casting machine, in combination, a matrix bar having a group of different intaglio type impressed upon one edge, and a corresponding series of aligning notches upon its other edge, an aligning bar a series of stops adapted to arrest the matrix bar with any desired notch opposite the aligning bar, and a detent to prevent rebound of the arresting matrix bar.

3. The combination with the matrix bar magazine, the assembly box, and mechanism for delivering a selected matrix from the magazine to the assembly box, of a series of stops, mechanism whereby the appropriate one of said stops is projected into the path of the delivered matrix to arrest its descent, and a detent to prevent rebound of the arrested matrix.

4. A series of matrix bars, each having a body piece of the same height and width, but differing in thickness, and an upwardly extending hook of different height for each species of matrix bar, a magazine having a separate chamber for each species of matrix and a wire for sustaining the same by their hooks, a channel leading from each chamber to adjacent delivery points, and a gate at each channel, said gate acting in its forward movement to project a matrix bar to the delivery point, and hold it there and in its rearward movement to release the same for use.

5. A matrix bar magazine comprising separate chambers for each species of matrix, a delivery channel extending at right angles from each chamber to the point of delivery, and an assembling box below the delivery point and receiving the matrix bars from all the channels.

6. A matrix bar magazine having separate chambers for each species of matrix, a delivery channel extending from each chamber to the point of delivery, each delivery channel being at right angles to the matrix bar chambers, and an assembling box below the delivery point and receiving the matrix bars from all the channels.

7. A matrix bar magazine having separate storage chambers for each species of matrix, a delivery chamber for each species of matrix arranged at right angles to the storage chambers, a delivering device in connection with each channel, and a vibrating device in each channel arranged to keep the matrix bar in position to engage the delivering device.

8. A magazine for storing matrix bars having a separate chamber for each species of matrix bar, a delivery channel extending at right angles from each chamber to the point of delivery and normally charged with matrix bars, a delivery device in connection with each channel, and a spring for accelerating the delivery of the matrix bar.

9. In a line casting machine in which the matrices, when released, descend by gravity, an accelerating device common to a plurality of matrices, and which operates on each of said matrices, only as that matrix is released, to hasten its descent.

10. In combination with a magazine comprising a separate chamber for each species of matrix bar, a separate delivery channel extending at right angles from each chamber to the delivery point, the assembling box arranged to receive matrix bars from all the channels, the race-way extending from the assembling box, an automatic detent at the entrance of the race-way, and an ejector for opening the assembling box and ejecting the matrix bars beyond the detent and into the race-way.

11. The combination with the magazine, the matrix bar delivering channels at right angles thereto, the delivery devices, the assembling box, the adjustable stops, a race-way extending at right angles thereto, a carriage for receiving the matrix bars and the ejector for opening the assembling box, and delivering the matrix bars to the carriage.

12. The combination of the assembly box, the series of stops adapted to be projected therein, the matrix bar magazine, the delivery gates therefor, the ejector, and the bell crank lever and its cam connected to and adapted to operate in connection with the delivery gates and the ejector, substantially as and for the purposes hereinbefore set forth.

13. A distributing device for matrix bars and the like comprising carriers and means for arranging them in one plane, when in receiving position and for separating them into other planes to deliver different species of matrix bars simultaneously.

14. A distributing device for matrix bars and the like, differing in species, comprising carriers and means for arranging them in one plane when in receiving position at the race-way, to engage all the matrix bars of a line, and for separating the carriers and matrix bars into other planes, according to species, and to deliver the matrix bars simultaneously to their proper magazines.

15. A distributing device for matrix bars and the like, constructed to receive a line of matrix bars in the path or race-way where they are assembled and raise them therefrom and separate them into different horizontal planes and deliver them properly separated, and simultaneously to the magazines whence they were taken.

16. In combination, the chambered magazine, a distributer having a matrix bar engaging wire for each chamber, said wires being carried upon radially moving arms or levers, constructed to swing them from the chambers to proper positions in the path or race-way for receiving the hooks of the matrix bars, and by a reverse movement to elevate and separate the different species of matrix bars, for delivery each to its proper chamber of the magazine.

17. The combination of the matrix bar magazine having separate chambers for each species of matrix bar, a supporting wire in each chamber upon which the matrix bars are sustained, a series of radially moving distributing arms or levers each provided with a distributing wire arranged to register with the corresponding wire of a magazine chamber when in its elevated position, and means for depressing said distributer arms to bring the distributer wires into a vertical plane over the race-way, to engage the selecting hooks of the several species of matrices.

18. The matrix bar distributer in combination with the chambered magazine, the distributer having a radially moving arm for each species of matrix bar, said series of arms each carrying a distributer wire, means for moving said arms, said arms being so pivoted and proportioned each to the other that in their downward position they will occupy a vertical plane above the race-way, and means for moving said arms upward, whereby upon such movement the arms will be separated horizontally, so as to register each with its corresponding chamber of the magazine, thereby elevating and separating the matrix bars according to species, and a pusher for wiping the matrix bars from the distributer wires into the storage chambers of the magazine.

19. In a line casting machine having a race-way for the matrices, a magazine having a separate chamber for each species of matrix bar, matrix bars divided into species each having a selecting device different from the other, distributing wire carriers normally registering each with a chamber of the magazine, and operating mechanism for first moving the distributing wire carriers to a position above the race-way where they will automatically receive the selecting devices of the matrix bars in the race-way and then changing their position to separate and transfer the matrices each to its proper magazine chamber.

20. In a line casting machine having a race-way and a carriage for moving the assembled line along the race-way, the combination with the distributer, the aligning bar, and the line carriage, of mechanism for depressing the matrix bars and spacers to predetermined levels after the casting operation and before they engage the distributer, and aligning-bar-retracting mechanism and carriage-spreading mechanism, which operate to withdraw the aligning bar from engagement with the matrix bars, and to loosen the hold of the carriage on the line, before the depressor acts thereon.

21. In combination, the key levers, the matrix bar releasing mechanism and the interchangeable slide bars connecting the key levers and matrix bar releasing mechanism.

22. In combination, the key levers, the matrix bar releasing mechanism and stop bars, and the interchangeable slide bars connecting the key levers, the matrix bar releasing mechanism and the stop bars.

23. In a line casting machine, the combination with the finger key levers, the stop bars and the matrix bar delivering mechanism all in fixed relation, of interchangeable slide bars extending between the key levers, the stop bars and the matrix bar delivering mechanism to be operated.

24. In combination, the finger key levers, the bail rods, the stop bars, and the slide bars connecting the key levers with the mechanism to be operated, said slide bars each provided with distinctive means for engaging predetermined combinations of stop bar and matrix bar delivering mechanism and arranged to be interchangeable with the key levers.

25. In combination, the finger key levers, their rear ends arranged in line across the key-board, the matrix bar releasing mechanism also in line across the key-board, the stop bars in line across the key-board, and the slide bars interchangeable with the key levers and each provided with extensions arranged to engage predetermined combinations of stop bar and matrix bar releasing mechanism, wherever located in their field.

26. In combination, the non-changeable finger key levers, stop bar and matrix bar delivering mechanisms, the assembly box into which the stop bars are projected and which is arranged to receive the matrix bars, and a series of interchangeable connecting bars intermediate the key levers, stop bars, and matrix bar delivering mechanism, and each provided with a selecting device or devices for projecting the desired stop into the assembly box and releasing the desired matrix bar.

27. In combination, the chambered matrix bar magazine, the delivering channels, the spring actuated delivery gates, the retracting device actuated by and restoring said gates to their operative positions, the spring detents for holding said gates, the slide bars $E^2$, each provided with extensions for rocking a bail and projecting a stop bar and releasing the desired matrix bar and arresting it at the desired point, and the key levers for actuating the said slide bars and with which they are interchangeable.

WILBUR STEPHEN SCUDDER.

Witnesses:
MARCELLUS BAILEY,
LOUIS C. HILLS.